(12) United States Patent  
Kyosuna et al.

(10) Patent No.: US 10,859,845 B2  
(45) Date of Patent: Dec. 8, 2020

(54) PROJECTION DEVICE, PROJECTION IMAGE CONTROL METHOD, AND RECORDING MEDIUM HAVING PROJECTION IMAGE CONTROL PROGRAM RECORDED THEREON

(71) Applicants: NEC Corporation, Tokyo (JP); NEC Platforms, Ltd., Kawasaki (JP)

(72) Inventors: Satoshi Kyosuna, Tokyo (JP); Satoshi Komatsu, Kanagawa (JP); Hirofumi Tsuda, Tokyo (JP)

(73) Assignees: NEC CORPORATION, Tokyo (JP); NEC Platforms, Ltd., Kawasaki (JP)

( * ) Notice: Subject to any disclaimer, the term of this patent is extended or adjusted under 35 U.S.C. 154(b) by 0 days.

(21) Appl. No.: 16/498,800

(22) PCT Filed: Feb. 16, 2018

(86) PCT No.: PCT/JP2018/005571  
§ 371 (c)(1),  
(2) Date: Sep. 27, 2019

(87) PCT Pub. No.: WO2018/179980  
PCT Pub. Date: Oct. 4, 2018

(65) Prior Publication Data  
US 2020/0033623 A1   Jan. 30, 2020

(30) Foreign Application Priority Data

Mar. 31, 2017   (JP) .................................. 2017-069541

(51) Int. Cl.  
*H04N 9/31* (2006.01)  
*G02B 27/48* (2006.01)  
(Continued)

(52) U.S. Cl.  
CPC ........... *G02B 27/48* (2013.01); *G03B 21/006* (2013.01); *G03B 21/208* (2013.01);  
(Continued)

(58) Field of Classification Search  
CPC .. H04N 9/3102; H04N 9/3161; H04N 9/3179; G02B 27/48; G03B 21/006; G03B 21/2033; G03B 21/208  
(Continued)

(56) References Cited

U.S. PATENT DOCUMENTS

2008/0247016 A1   10/2008 Facius  
2009/0257028 A1   10/2009 Osawa et al.  
(Continued)

FOREIGN PATENT DOCUMENTS

JP   2008-225152 A   9/2008  
JP   2008-257238 A   10/2008  
(Continued)

OTHER PUBLICATIONS

Edwards Buckley, "Computer-Generated Phase-Only Holograms for Real-Time Image Display", Advanced Holography-Metrology and Imaging, pp. 277-304.  
(Continued)

*Primary Examiner* — Michael Lee  
(74) *Attorney, Agent, or Firm* — Sughrue Mion, PLLC

(57) ABSTRACT

A projection device is provided with at least: a laser light source which emits laser light; a conversion unit which converts the laser light into parallel light; a phase-modulation-type spatial modulation element which phase-modulates the parallel light on the basis of a supplied projection image and delivers phase-modulated light; and a control unit. The control unit includes: a projection image storage unit in which at least one projection image group is stored; a processing unit which, with respect to one projection  
(Continued)

image acquired from the projection image storage unit in synchronism with an update period, generates a combination of a plurality of diffraction patterns in the update period; and a projection image generation unit which supplies the combination of a plurality of diffraction patterns to the phase-modulation-type spatial modulation element as the supplied projection image.

12 Claims, 13 Drawing Sheets

(51) Int. Cl.
    *G03B 21/00*     (2006.01)
    *G03B 21/20*     (2006.01)

(52) U.S. Cl.
    CPC ....... *G03B 21/2033* (2013.01); *H04N 9/3102* (2013.01); *H04N 9/3161* (2013.01); *H04N 9/3179* (2013.01)

(58) Field of Classification Search
    USPC .......................................................... 348/766
    See application file for complete search history.

(56) References Cited

U.S. PATENT DOCUMENTS

| | | | |
|---|---|---|---|
| 2011/0002019 A1* | 1/2011 | Routley | ................ G02B 27/48 359/9 |
| 2011/0242498 A1 | 10/2011 | Kosaka et al. | |
| 2013/0335642 A1 | 12/2013 | Fujioka | |
| 2014/0253987 A1* | 9/2014 | Christmas | ............ G03H 1/0808 359/9 |
| 2015/0036108 A1 | 2/2015 | Taniguchi et al. | |
| 2015/0116800 A1 | 4/2015 | Yoshida et al. | |
| 2016/0205363 A1* | 7/2016 | Okumura | ............. H04N 9/3155 348/177 |
| 2017/0085846 A1* | 3/2017 | Damberg | ................. H04N 5/74 |

FOREIGN PATENT DOCUMENTS

| | | |
|---|---|---|
| JP | 2011-215172 A | 10/2011 |
| JP | 2012-190053 A | 10/2012 |
| JP | 2012-237814 A | 12/2012 |
| JP | 2015-081953 A | 4/2015 |
| JP | 2015-087595 A | 5/2015 |
| WO | 2012/117548 A1 | 9/2012 |
| WO | 2015/022897 A1 | 2/2015 |
| WO | 2017/013862 A1 | 1/2017 |

OTHER PUBLICATIONS

Xudong Zhao, et al., "Improved direct binary search-based algorithm for generating holograms for the application of holographic optical tweezers", Optical Engineering, Jan. 2012, vol. 51, No. 1.
International Search Report for PCT/JP2018/005571 dated May 1, 2018 [PCT/ISA/210].
Written Opinion for PCT/JP2018/005571 dated May 1, 2018 [PCT/ISA/237].

* cited by examiner

PROJECTION DEVICE, PROJECTION IMAGE CONTROL METHOD, AND RECORDING MEDIUM HAVING PROJECTION IMAGE CONTROL PROGRAM RECORDED THEREON

CROSS REFERENCE TO RELATED APPLICATIONS

This application is a National Stage of International Application No. PCT/JP2018/005571 filed Feb. 16, 2018, claiming priority based on Japanese Patent Application No. 2017-069541 filed Mar. 31, 2017.

TECHNICAL FIELD

This invention relates to a projection device and, in particular, relates to a projection device including a phase-modulation spatial modulating element, a projection image control method, and a recording medium having a projection image control program recorded thereon.

BACKGROUND ART

A plurality of systems are known as projection devices for a picture or an image. As one of those systems, there is a projection device using a phase-modulation spatial modulating element. Hereinafter, such a projection device will be called a "phase-modulation projection device." The phase-modulation projection device uses a laser as a light source and forms a projected image by diffracting laser light on the basis of information of each pixel.

Patent Literature 1 discloses such a phase-modulation projection device. The phase-modulation projection device disclosed in Patent Literature 1 includes a laser light source, a shaping optical assembly, a phase-modulation spatial modulating element, a Fourier transform lens, a polarization preservation element, a monitor element, a control unit, an image forming optical assembly, and a projection optical assembly. The laser light source emits laser light. The shaping optical assembly converts the laser light into parallel light to shape the laser light. The phase-modulation spatial modulating element phase-modulates the parallel light to deliver phase-modulated light. The Fourier transform lens Fourier-transforms the phase-modulated light to deliver Fourier-transformed light. The polarization preservation element is positioned within an optical path of the Fourier-transformed light and reflects a part of the light as reflected light. The monitor element monitors an intensity of the reflected light to produce a monitored signal. The control unit controls either the laser light source or the phase-modulation spatial modulating element on the basis of the intensity of the monitored signal. The image forming optical assembly forms an image of the light which has been transmitted through the polarization preservation element to produce image-formed light. The projection optical assembly projects the image-formed light.

In Patent Literature 1, the phase-modulation spatial modulating element has a plurality of photosensitive areas. The control unit controls a refractive index of each photosensitive area of the phase-modulation spatial modulating element in accordance with information of each pixel of the image to be projected. As a result, the parallel light is phase-modulated and information of the image is preserved in the light. As the phase-modulation spatial modulating element, for example, a ferroelectric liquid crystal, a homogeneous liquid crystal, and a homeotropic liquid crystal may be used.

In addition, in Patent Literature 1, the control unit calculates an intensity of projected light on the basis of the intensity of the reflected light that is supplied from the monitor element and controls at least one of the laser light source and the phase-modulation spatial modulating element so that the intensity of the projected light does not exceed a reference value. That is, the control unit controls the intensity of the projected light.

Patent Literature 2 discloses an image projection device for controlling a laser used as a light source according to an input image while constantly satisfying a safety standard for laser light. The image projection device disclosed in Patent Literature 2 includes lasers, a dichroic mirror, an LCOS (Liquid-Crystal-On-Silicon) panel, a projection lens, and a processing unit. The lasers are provided for each of a plurality of colors and emit laser light of each color. The dichroic mirror synthesizes the laser light of each color that are emitted from the lasers of each color. The LCOS panel modulates, according to an image signal, synthesized light synthesized by the dichroic mirror. The processing unit determines, according to the image signal, a ratio of power of the laser light of each color that are emitted from the lasers of each color, determines, according to the ratio of power, an upper limit value of power of projected light of each color in a range which satisfies the safety standard for the laser light, and adjusts the laser light emitted from the lasers so that the projected light of each color that is projected from the projection lens does not exceed the upper limit value.

However, it is known that speckles occur when a highly coherent light source, such as a laser, is used as a light source. Herein, the speckles mean a pattern having a random light intensity, which is formed as a result of interference of scattered light of the highly-coherent light source, such as the laser, on a sensor surface (e.g. a retina in a case of a human being) of a visual system of a viewer.

In as much as a screen for a projected image is a rough surface, the scattered light is subjected to random phase variation. This light is diffracted by a pupil of the viewer, interference occurs on the retina, and an intensity distribution having a random interference pattern according to the phase variation, namely, the speckles are observed. In addition, this is a noise component which does not exist in an original signal as an image and, therefore, may be called a speckle noise. Thus, the speckles are a granular interference noise inherent to the laser light source.

Various projection devices intended to decrease such a speckle noise have been proposed.

For example, Patent Literature 3 discloses a "projection type display device" capable of easily reducing a speckle noise when a light source having coherency is used. The projection type display device disclosed in Patent Literature 3 includes light emission means, image light generation means, projection means, and phase modulation means. The light emission means includes at least one light source for emitting coherent light. The image light generation means modulates the light emitted from the light emission means to generate image light. The projection means projects the image light. The phase modulation means is disposed between the light emission means and the image light generation means or between the image light generation means and the projection means. The phase modulation means includes a birefringent material layer having a region in which an azimuth direction of a slow axis is distributed in different directions within a plane orthogonal to an optical axis and in which a retardation value is constant.

Patent Literature 4 discloses a "projector" which is capable of suppressing occurrence of speckles. The projector includes a light source, a diffraction optical element, an incident position switching device, an optical modulation device, a superposition optical system, and a projection optical system. The light source emits light. The diffraction optical element includes a plurality of cells which are disposed on an optical path of the light emitted from the light source. The incident position switching device moves an incident position of the light among the plurality of cells. The optical modulation device has an image forming region. The optical modulation device modulates the light according to an image signal to generate image light. The superposition optical system causes a plurality of pieces of diffraction light emitted from the diffraction optical element to be superposed on one another on the image forming region. The projection optical system projects the light emitted from the light modulation device. The plurality of cells includes a first cell having a first diffraction element pattern, a second cell having a second diffraction element pattern different from the first diffraction element pattern, and a third cell having a third diffraction element pattern. The projector is configured so that the light is simultaneously incident to the first cell and the second cell.

In addition, in a first example embodiment in Patent Literature 4, the diffraction optical element includes a Computer Generated Hologram (CGH). The diffraction optical element has a plurality of cells arranged in an array. The CGH is a surface relief type hologram element having a minute uneven structure designed by a computer and formed on one surface of a substrate made of a light transmitting material, for example, quartz (glass), a synthetic resin, or the like. The diffraction optical element includes a plurality of concave portions having rectangular sectional shapes different in depth from one another and a plurality of convex portions having rectangular sectional shapes different in height from one another. As a method of optimizing a design condition of the diffraction optical element, an operation method, for example, an IFTA (Iterative Fourier Transform Algorithm) or the like may be used.

The diffraction optical element is connected to the incident position switching device. The incident position switching device has a function of causing the diffraction optical element to vibrate (reciprocate) in an arrangement direction of the plurality of cells thereof. The incident position switching device includes, for example, a piezo actuator. The incident position switching device does not always cause the diffraction optical element to vibrate but may cause the diffraction optical element, for example, to rotate around a rotation axis perpendicular to a main surface thereof.

Furthermore, in a second example embodiment in Patent Literature 4, the diffraction optical element has a plurality of diffraction element pattern regions to which a plurality of laser light emitted from the plurality of semiconductor lasers are incident. Each diffraction element pattern region has a plurality of subregions having diffraction element patterns different from one another. The diffraction optical element is connected to a driving mechanism for driving the diffraction optical element. The driving mechanism includes a swing driving unit for causing the diffraction optical element to swing within the main surface thereof. As a specific configuration of the swing driving unit, a motor, an eccentric cam, or the like well known in the art may be used.

In the projector having such a configuration, it is possible to suppress deterioration of a display quality due to the occurrence of speckles, because the speckle patterns, different from one another, which are obtained from the plurality of cells of the diffraction optical element are superposed both spatially and temporally.

Incidentally, in Patent Literature 1 and Patent Literature 2, information of each pixel of the image (the image signal) supplied to the phase-modulation spatial modulating element (the LCOS panel) is obtained by converting the original image into a phase image by using a well-known image forming technique. As the well-known image forming technique, there is an iterative Fourier transform method or a direct binary search (DBS) method.

The iterative Fourier transform method carries out optimization of a phase distribution while repeating Fourier transform and inverse Fourier transform so that a target optical intensity distribution is obtained. In order to generate a projection image using a diffraction phenomenon of light, a phase pattern is prepared using the iterative Fourier transform method. Preparation of the phase pattern is disclosed in, for example, Non Patent Literature 1. The phase pattern is also called a diffraction pattern.

On the other hand, the direct binary search (DBS) method is disclosed in, for example, Non Patent Literature 2. The direct binary search method is one of halftoning methods and is a method to minimize an error between an input image and an output image.

CITATION LIST

Patent Literature

PTL 1: WO 2015/022897 A1
PTL 2: WO 2012/117548 A1
PTL 3: JP 2011-190053 A
PTL 4: JP 2015-081953 A

Non Patent Literature

NPL 1: Edward Buckley "Computer-Generated Phase-Only Holograms for Real-Time Image Display", Advanced Holography-Metrology and Imaging, pp. 277-303
NPL 2: XuDong Zhao, et al. "Improved direct binary search-based algorithm for generating holograms for the application of holographic optical tweezers", Optical Engineering, Vol. 51(1), 015801 (January 2012)

SUMMARY OF INVENTION

Technical Problem

However, the above-mentioned Patent Literatures 1-4 have problems which will hereinafter be described.

Patent Literatures 1 and 2 do not recognize a problem about occurrence of speckles and cannot suppress the occurrence of the speckles.

On the other hand, Patent Literature 3 optically takes measures against the occurrence of the speckles by providing the phase modulation means in addition to the image light generation means. This results in a problem that the device is increased in size due to addition of such countermeasure component.

Patent Literature 4 mechanically takes measures against the occurrence of the speckles also by providing the diffraction optical element and the incident position switching device (driving mechanism) in addition to the optical modulation device. Herein, it is noted that the diffraction optical element in Patent Literature 4 has the fixed minute uneven structure designed by the computer and the uneven structure is not changed once it is designed. In other words, the fixed minute uneven structure is quite irrelevant to the image light to be projected (does not depend on the image light). As a result, there is a problem that the cost of manufacturing the device is increased and the size of the device is increased. In addition, there is a problem that any mechanical component such as the incident position switching device (the driving mechanism) may possibly break down.

It is an object of this invention to provide a projection device including a phase-modulation spatial modulating element, a projection image control method, and a recording medium with a projection image control program recorded therein, which are capable of solving the above-mentioned problems.

Solution to Problem

According to a first aspect of the present invention, there is provided a projection device, at least comprising a laser light source configured to emit laser light; a conversion unit configured to convert the laser light into parallel light; a phase-modulation spatial modulating element configured to phase-modulate the parallel light on the basis of a supplied projection image to deliver phase-modulated light; and a control unit configured to control the supplied projection image, wherein the control unit comprises a projection image storage unit configured to memorize at least one group of projection images therein; a processing unit configured to generate, with respect to one projection image acquired from the projection image storage unit in synchronism with an update period, a combination of a plurality of diffraction patterns within the update period; and a projection image generation unit configured to supply the combination of the plurality of diffraction patterns to the phase-modulation spatial modulating element as the supplied projection image.

In addition, according to a second aspect of the present invention, there is provided a projection image control method which is used in a projection device at least comprising a laser light source configured to emit laser light; a conversion unit configured to covert the laser light into parallel light; and a phase-modulation spatial modulating element configured to phase-modulate the parallel light on the basis of a supplied projection image to deliver phase-modulated light, and which is adapted to control the supplied projection image, the projection image control method comprises a memorizing step of preliminarily memorizing at least one group of projection images in a projection image storage unit a processing step of generating, with respect to one projection image acquired from the projection image storage unit in synchronism with an update period, a combination of a plurality of diffraction patterns within the update period; and a projection image generating step of supplying the combination of the plurality of diffraction patterns to the phase-modulation spatial modulating element as the supplied projection image.

Furthermore, according to a third aspect of the present invention, there is provided a recording medium with a projection image control program recorded therein to cause a controller in a projection device at least comprising a laser light source configured to emit laser light; a conversion means unit configured to covert the laser light into parallel light; and a phase-modulation spatial modulating element configured to phase-modulate the parallel light on the basis of a supplied projection image to deliver phase-modulated light, to control the supplied projection image, wherein the controller comprises a projection image storage unit configured to memorize at least one group of projection images therein and a projection image generation unit configured to supply the supplied projection image to the phase-modulation spatial modulating element, wherein the projection image control program causes the controller to execute a processing step of generating, with respect to one projection image acquired from the projection image storage unit in synchronism with an update period, a combination of a plurality of diffraction patterns within the update period, and causing the projection image generation unit to generate the combination of the plurality of diffraction patterns as the supplied projection image.

Advantageous Effect of Invention

According to this invention, it is possible to provide a projection device, a projection image control method, and a recording medium with a projection image control program recorded therein, which are capable of improving a picture quality of a projected image and reducing speckles without using a mechanical or an optical measure.

DESCRIPTION OF EMBODIMENTS

[Related Arts]

First, related arts will be described in detail in order to facilitate an understanding of this invention.

In a case where a quality of laser light irradiated to a phase-modulation spatial modulating element is inferior or in a case where the quality becomes equivalent to that in the case where the quality is inferior because a sufficient space for forming the laser light cannot be secured, this results in degradation of a picture quality such as deformation of a shape of a projected image or nonuniformity of brightness. Specifically, the case where the quality of the laser light is inferior means a case where a wavefront is deformed and a case where a traveling direction and an in-plane strength of light are nonuniform.

In addition, as a problem inherent to the projection device with a laser as a light source, there is known the occurrence of speckles mentioned above. When the speckles are strong, a measuring instrument or an eyeball may be adversely affected due to unintended local bright light to cause a risk.

Figure 1:
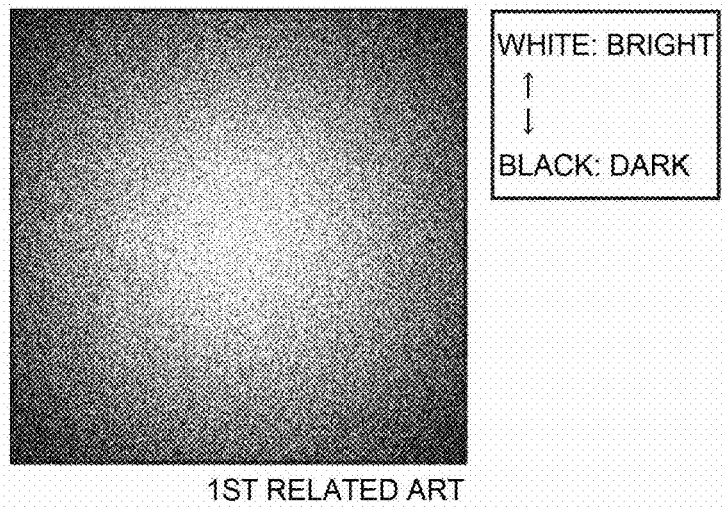
FIG. 1 is a view for illustrating an example of an intensity distribution characteristic of laser light with a good quality.
Figure 2:
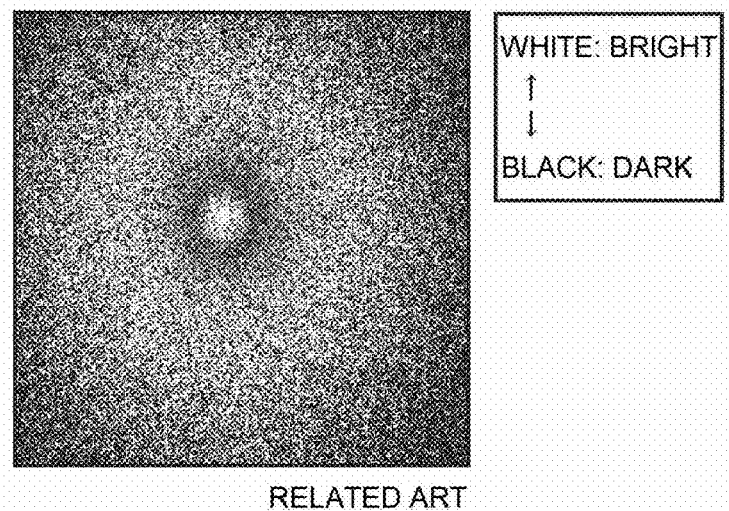
FIG. 2 is a view for illustrating an example of an intensity distribution characteristic of laser light without a good quality.

FIG. 1 is a view for illustrating an example of an intensity distribution characteristic of laser light with a good quality. FIG. 2 is a view for illustrating an example of an intensity distribution characteristic of laser light without a good quality. Both of FIGS. 1 and 2 are graphic illustrations of an intensity distribution of the laser light after passing through a collimator lens. More specifically, FIGS. 1 and 2 show a difference between projected images when the same diffraction pattern is used.

Comparing FIG. 1 with FIG. 2, it is understood that the laser light without a good quality (FIG. 2) has the intensity distribution which deviates with respect to a Gaussian distribution as compared with the laser light with a good quality (FIG. 1).

Figure 3:
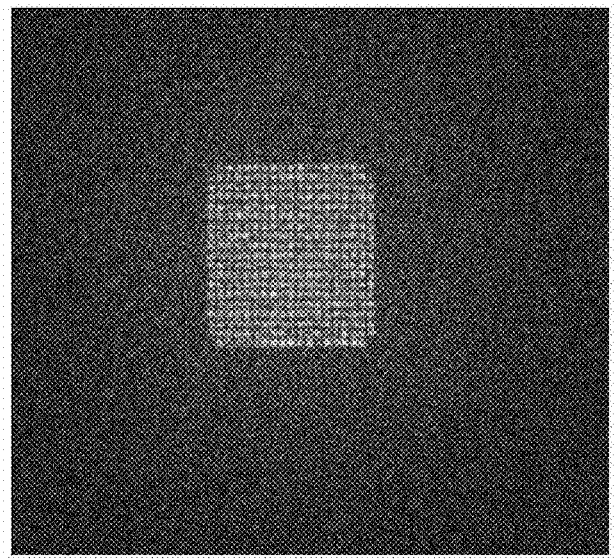
FIG. 3 is a view for illustrating an example of a projected image generated by the laser light with a good quality.
Figure 4:
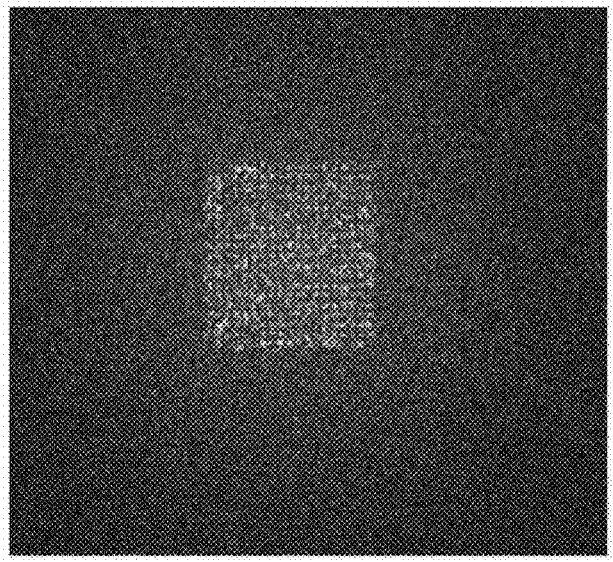
FIG. 4 is a view for illustrating an example of a projected image generated by the laser light without a good quality.

FIG. 3 is a view for illustrating an example of a projected image generated by the laser light with a good quality. FIG. 4 is a view for illustrating an example of a projected image generated by the laser light without a good quality. It is understood that, in the projected image of FIG. 4, deformation of dot shapes and nonuniformity of brightness are caused as compared with the projected image of FIG. 3.

In such a case, a first related art used a laser having the intensity distribution characteristic with a good quality as shown in FIG. 1 in order to improve the quality of the laser light. However, there is a problem that an expensive laser diode must be used for that purpose and therefore the cost of manufacturing the device increases.

Figure 5:
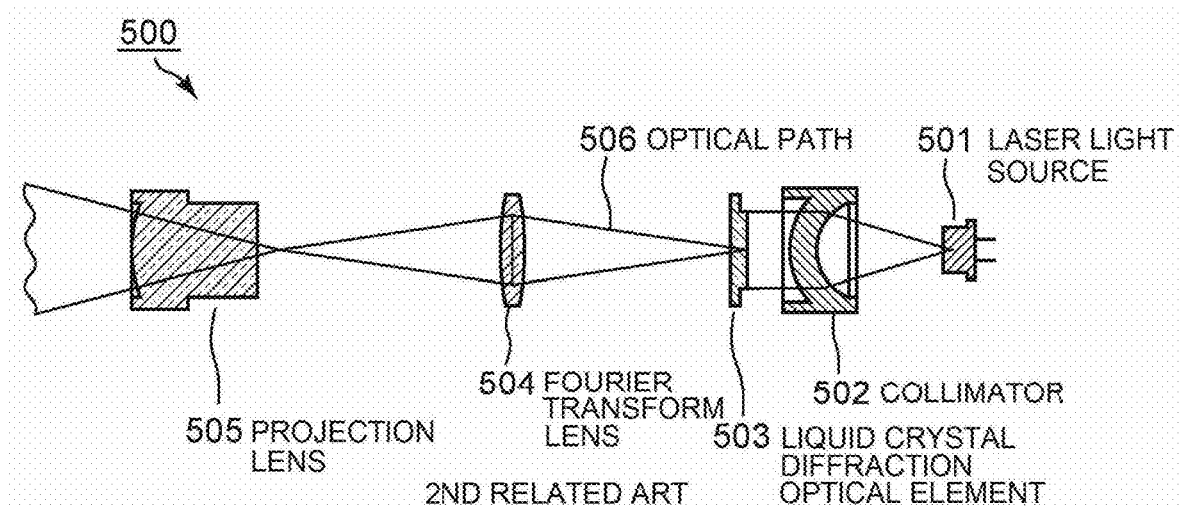
FIG. 5 is a diagram for illustrating a schematic configuration of a projection device of a second related art.

FIG. 5 is a diagram for illustrating a schematic configuration of a projection device 500 of a second related art. The illustrated projection device 500 includes a laser light source 501, a collimator 502, a liquid crystal diffraction optical element 503, a Fourier transform lens 504, and a projection lens 505. The Fourier transform lens 504 is disposed in an optical path 506 between the liquid crystal diffraction optical element 503 and the projection lens 505. The laser light source 501 is a laser having a large-sized beam diameter. The collimator 502 also is a large-sized collimator.

The laser light source 501 emits laser light. The collimator 502 converts the laser light into parallel light. The collimator 502 has a function of converting the laser light into the parallel light in order to obtain a desired diffraction effect. The collimator 502 is a type of shaping optical system. The parallel light is incident to the liquid crystal diffraction optical element 503. The liquid crystal diffraction optical element 503 comprises a phase-modulation spatial modulating element. The liquid crystal diffraction optical element 503 phase-modulates the parallel light to deliver phase-modulated light. The Fourier transform lens 504 Fourier-transforms the phase-modulated light to deliver Fourier-transformed light. The projection lens 505 projects the Fourier-transformed light toward a screen which is not shown in the figure.

In order to prevent the deformation of dot shapes and the nonuniformity of brightness mentioned above, the second relate art used a combination of the laser light source 501 having the large-sized beam diameter and the large-sized collimator 502 as shown in FIG. 5. However, for that purpose, there is a problem that the size of the device increases due to increase in size of components or addition of a countermeasure component.

Figure 6:
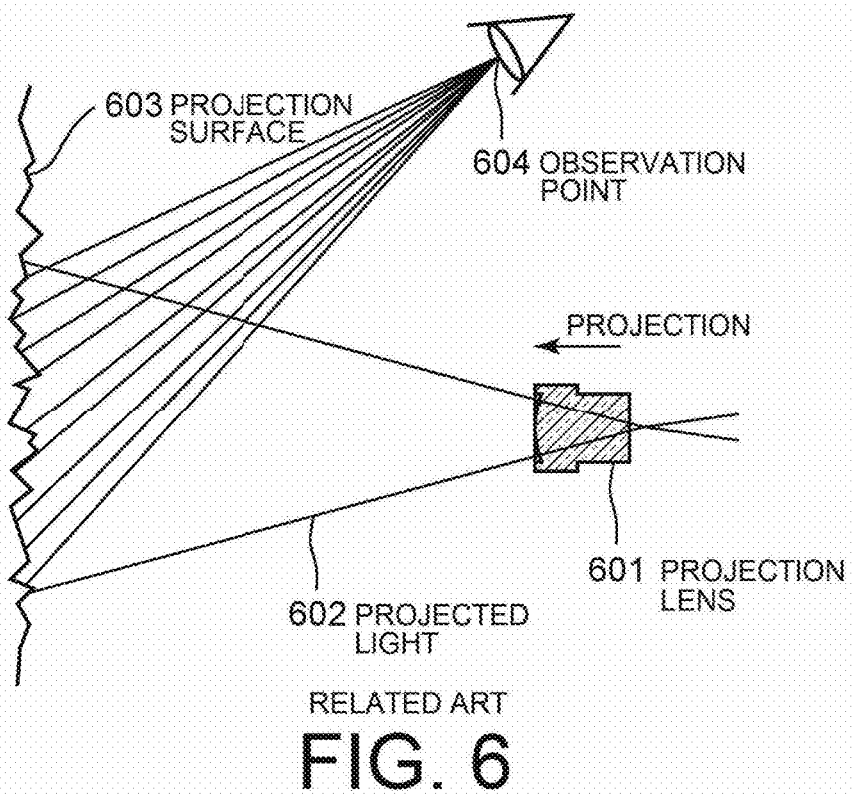
FIG. 6 is a view for use in describing speckles in a state without any countermeasure.

FIG. 6 is a view for use in describing speckles in a state without any countermeasure. Projected light 602 projected from a projection lens 601 is reflected by a projection surface 603 of the above-mentioned screen and reaches an observation point 604.

As described above, regardless of whether the quality of the laser light is good or inferior, the occurrence of speckles is induced as a result of mutual interference of light scattered at the projection surface 603 of the screen as shown in FIG. 6.

Figure 7:
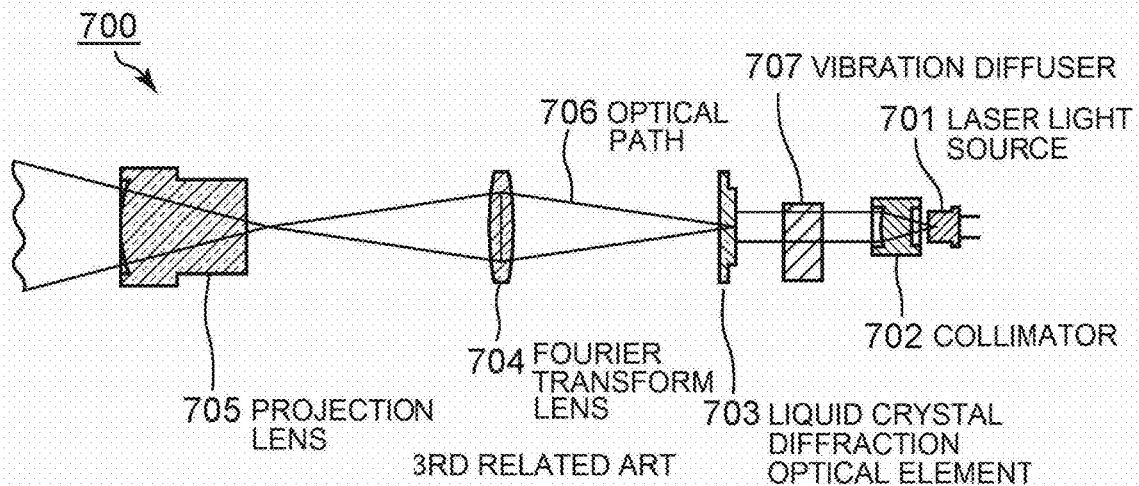
FIG. 7 is a diagram for illustrating a schematic configuration of a projection device of a third related art, in which occurrence of speckles is suppressed.

FIG. 7 is a diagram for illustrating a schematic configuration of a projection device 700 of a third related art, in which such occurrence of speckles is suppressed. The illustrated projection device 700 includes a laser light source 701, a collimator 702, a liquid crystal diffraction optical element 703, a Fourier transform lens 704, and a projection lens 705. The Fourier transform lens 704 is disposed in an optical path 706 between the liquid crystal diffraction optical element 703 and the projection lens 705. The projection device 700 further includes a vibration diffuser 707. In the example being illustrated, the vibration diffuser 707 is inserted between the collimator 702 and the liquid crystal diffraction optical element 703.

In order to suppress the occurrence of the speckles, the projection device 700 with a laser as the light source 701 according to the third related art takes a measure by shifting an interference point in a minute time interval using a mechanical element such as the vibration diffuser 707.

Figure 8:
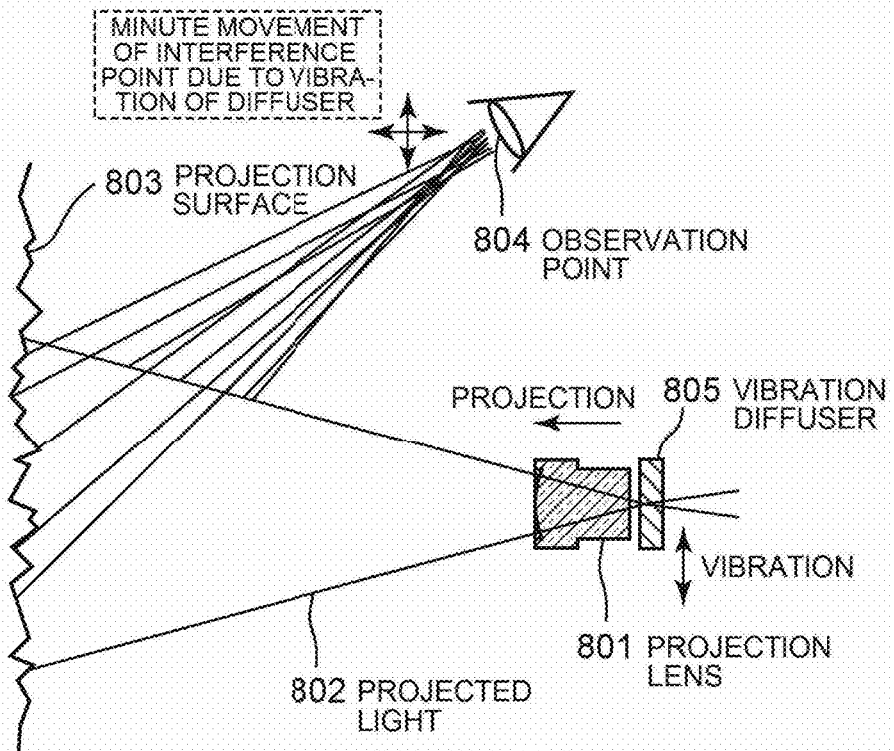
FIG. 8 is a view for use in describing speckles in a case where a vibration diffuser is used.

FIG. 8 is a view for use in describing speckles in a case where the vibration diffuser is used. Projected light 802 projected from a projection lens 802 is reflected by a projection surface 803 of a screen and reaches an observation point 804. By vibrating a vibration diffuser 805 provided in front of the projection lens 801, the interference point is shifted in a minute time interval.

Alternatively, a measure has been taken by vibrating the projection surface 803 itself. With such a measure, however, there are problems such as an increase in cost of manufacturing the device, an increase in size of the device, and a failure of the vibration diffuser 707 itself serving as the mechanical element.

On the other hand, as described above, the above-mentioned Patent Literature 3 optically takes measures against the occurrence of the speckles by providing the phase modulation means in addition to the image light generation means. As a result, there is a problem that the size of the device increases due to addition of the countermeasure component.

Furthermore, as described above, the above-mentioned Patent Literature 4 mechanically takes measures against the occurrence of the speckles also by providing the diffraction optical element and the incident position switching device (the driving mechanism) in addition to the optical modulation device. As a result, there is a problem that the cost of manufacturing the device increases and the size of the device increases. In addition, there is a problem that the mechanical element such as the incident position switching device (the driving mechanism) may possibly break down.

Example Embodiment

Now, an example embodiment of the present invention will be described with reference to the drawings. It is noted that the technical scope of the present invention is not limited by the example embodiment but should be construed on the basis of description of the claims.

Following miniaturization of the phase-modulation spatial modulating element, there is a tendency to require miniaturization and cost-saving of the projection device to which the element is mounted. Accordingly, the present invention solves the above-mentioned problems by means of a software measure, which will later be described, without using an additional component in a laser optical system.

Figure 9:
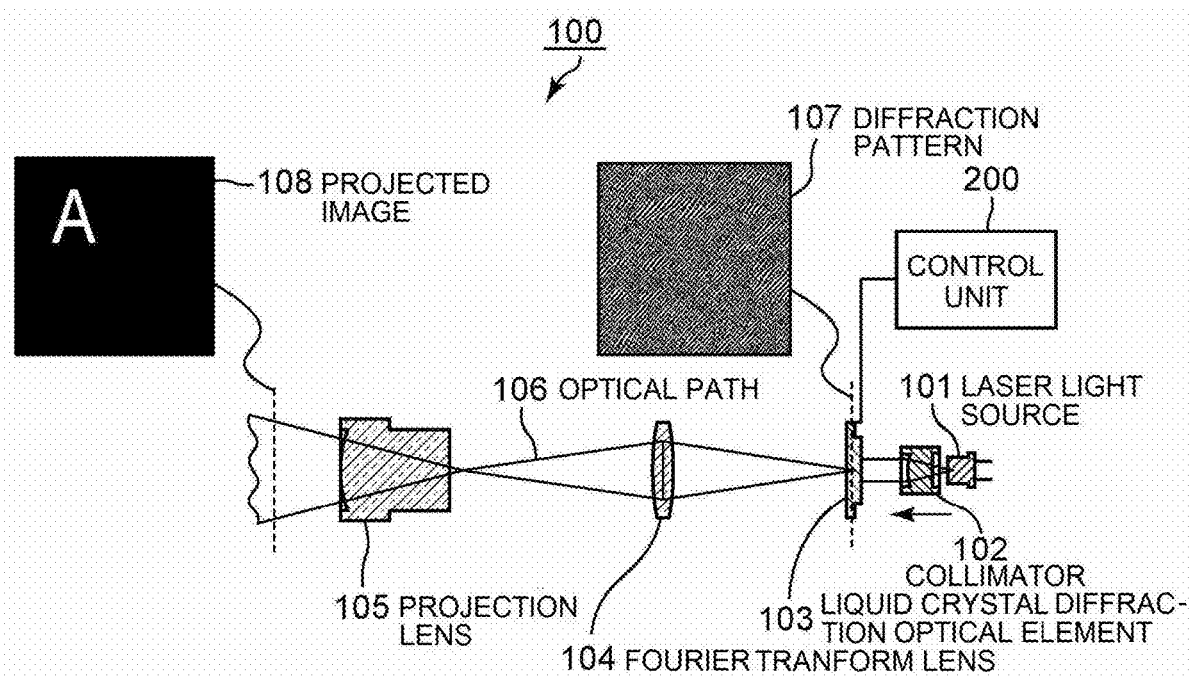
FIG. 9 is a diagram for illustrating a schematic configuration of a projection device according to an example embodiment of the present invention.

FIG. 9 is a diagram for illustrating a schematic configuration of a projection device 100 according to an example embodiment of the present invention. The illustrated projection device 100 includes a laser light source 101 comprising a laser diode, a collimator 102 comprising a collimator lens, a liquid crystal diffraction optical element 103 comprising a phase-modulation spatial modulating element, a Fourier transform lens 104, and a projection lens 105. The projection device 100 is an optical module in which optical systems of such configuration are assembled. The projection device 100 includes a control unit 200. The control unit 200 is also called a controller.

Now, description will proceed to a basic operation as regards the projection device 100 including the phase-modulation spatial modulating element illustrated in an example of FIG. 9.

In the example, laser light emitted from the laser diode as the laser light source 101 is converted by the collimator lens 102 into parallel light which is irradiated to the phase-modulation spatial modulating element 103. The collimator lens 102 has a function of converting the laser light into the parallel light in order to obtain a desired diffraction effect. As described above, the collimator lens 102 is a type of shaping optical system.

In the phase-modulation spatial modulating element 103, a phase-modulation liquid crystal is incorporated. By inputting, to the phase-modulation liquid crystal, a diffraction pattern 107 for phase-modulating the parallel light, the phase-modulation spatial modulating element 103 carries out phase modulation on the basis of the diffraction pattern 107. Accordingly, the irradiated laser light is phase-modulated and a projected image 108 as an object to be obtained. In order to project the generated projected image 108 at any angle of view, the projection lens 105 is arranged at a later stage to carry out enlargement or reduction of the projected image 108.

Figure 10:
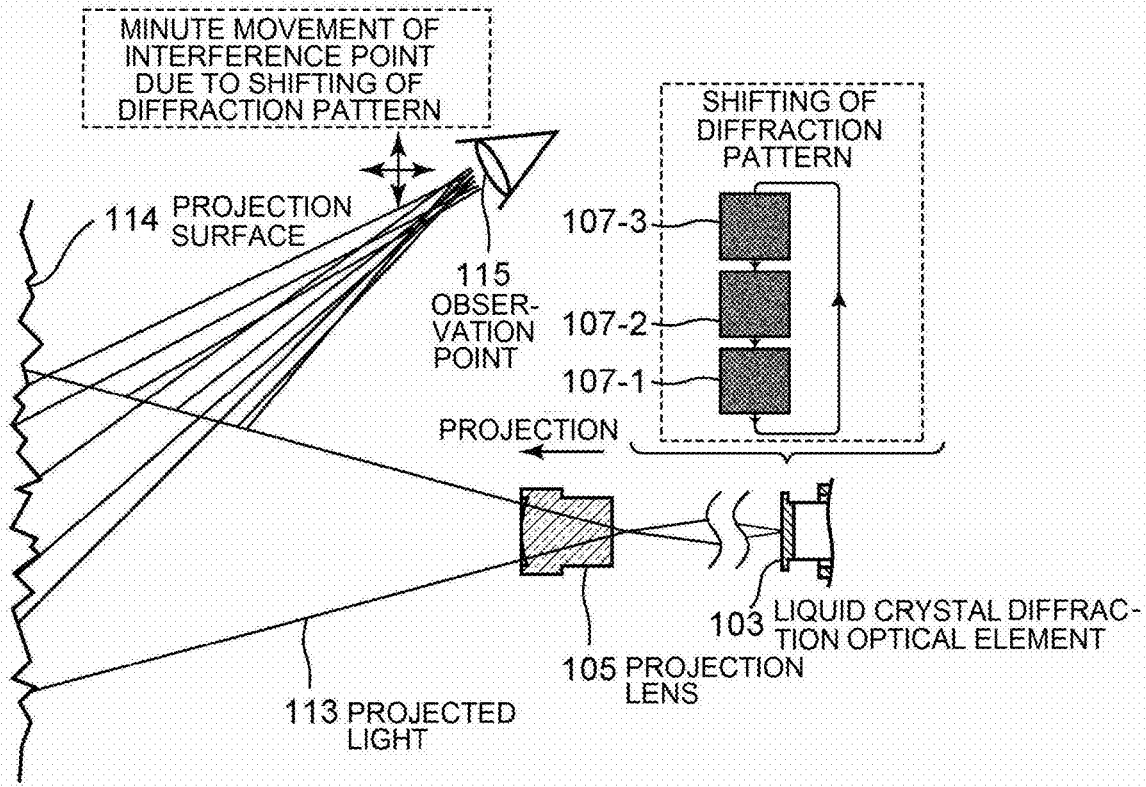
FIG. 10 is a view for use in describing an operation of the projection device illustrated in FIG. 9.

FIG. 10 is a view for use in describing an operation of the projection device 100 according to the example embodiment.

In an example of normal use of the projection device, one diffraction pattern 107 per one projected image 108 is inputted to the liquid crystal diffraction optical element 103. In comparison with this, in the projection device 100 of the example embodiment, per one projected image 108, first through third diffraction patterns 107-1, 107-2, and 107-3 which are shifted by every ⅓ are successively inputted from the control unit (the controller) 200. In a case where each projected image 108 has an update period of (1/60) seconds, each of the diffraction patterns 107-1 to 107-3 has an update period (a shift period) of (1/180) seconds.

It is noted here that the "diffraction pattern" 107 supplied to the liquid crystal diffraction optical element 103 in this example embodiment is different from the "diffraction element pattern" formed in the diffraction optical element described in the above-mentioned Patent Literature 4. That is, as described above, in Patent Literature 4, the "diffraction element pattern" formed in the diffraction optical element is a fixed minute uneven structure which is irrelevant to image light to be projected (does not depend on the image light). In comparison with this, the "diffraction pattern" 107 supplied to the liquid crystal diffraction optical element 103 in this example embodiment is a pattern corresponding to a projection image that is required to project the image.

Figure 11:
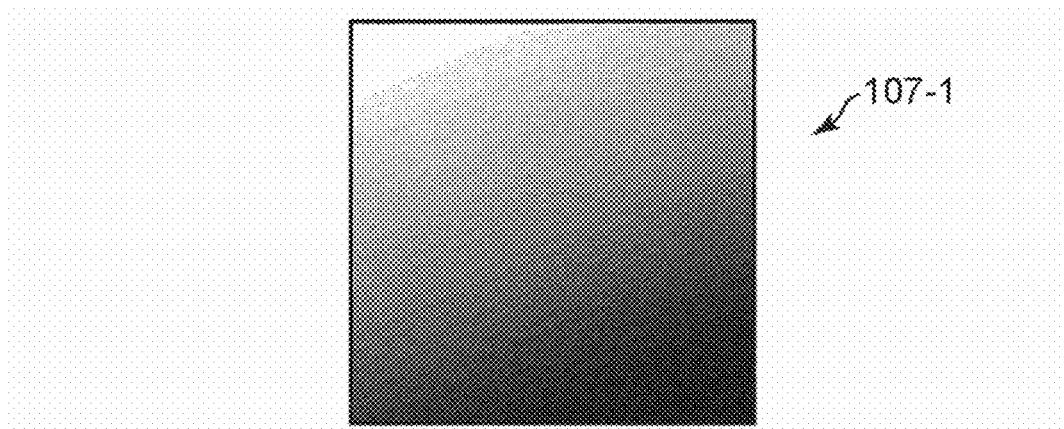
FIG. 11 is a view for illustrating an example of a first diffraction pattern without shifting.

FIG. 11 is a view for illustrating an example of the first diffraction pattern 107-1 without shifting.

Figure 12:
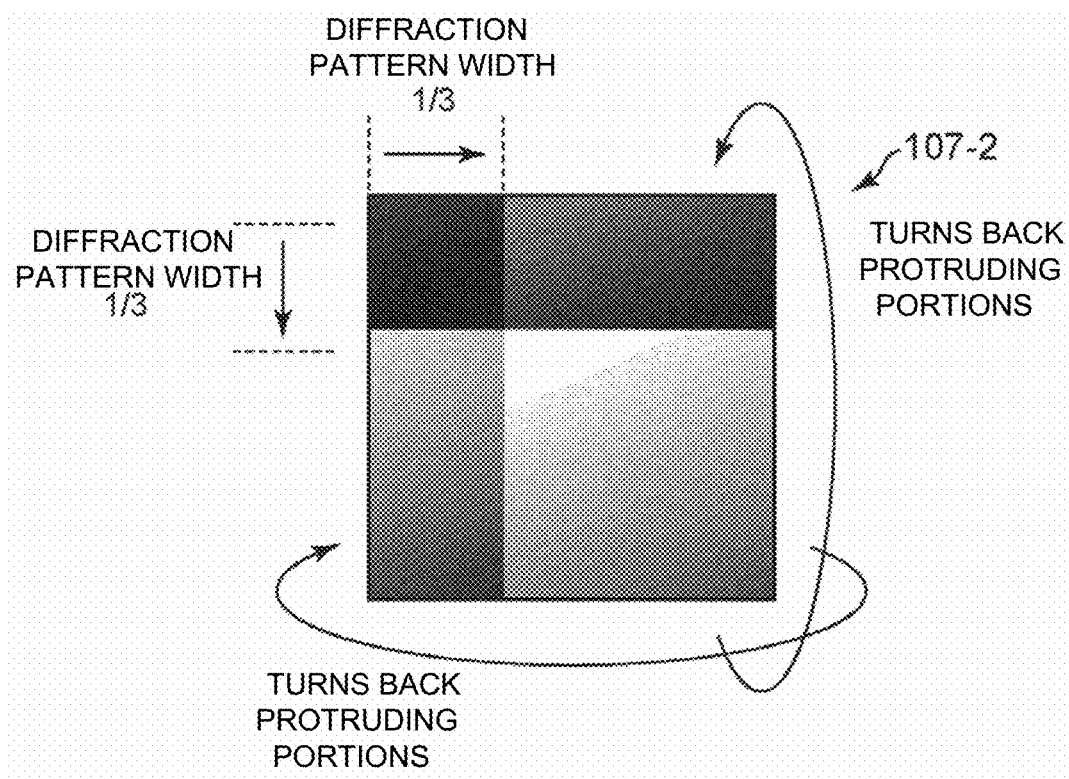
FIG. 12 is a view for illustrating an example of a second diffraction pattern shifted by ⅓ of a diffraction pattern width.

FIG. 12 is a view for illustrating an example of the second diffraction pattern 107-2 shifted by ⅓ of a diffraction pattern width. The second diffraction pattern 107-2 is a pattern obtained by shifting the first diffraction pattern 107-1 by ⅓ of the diffraction pattern width. As shown in FIG. 12, protruding portions are turned back.

Figure 13:
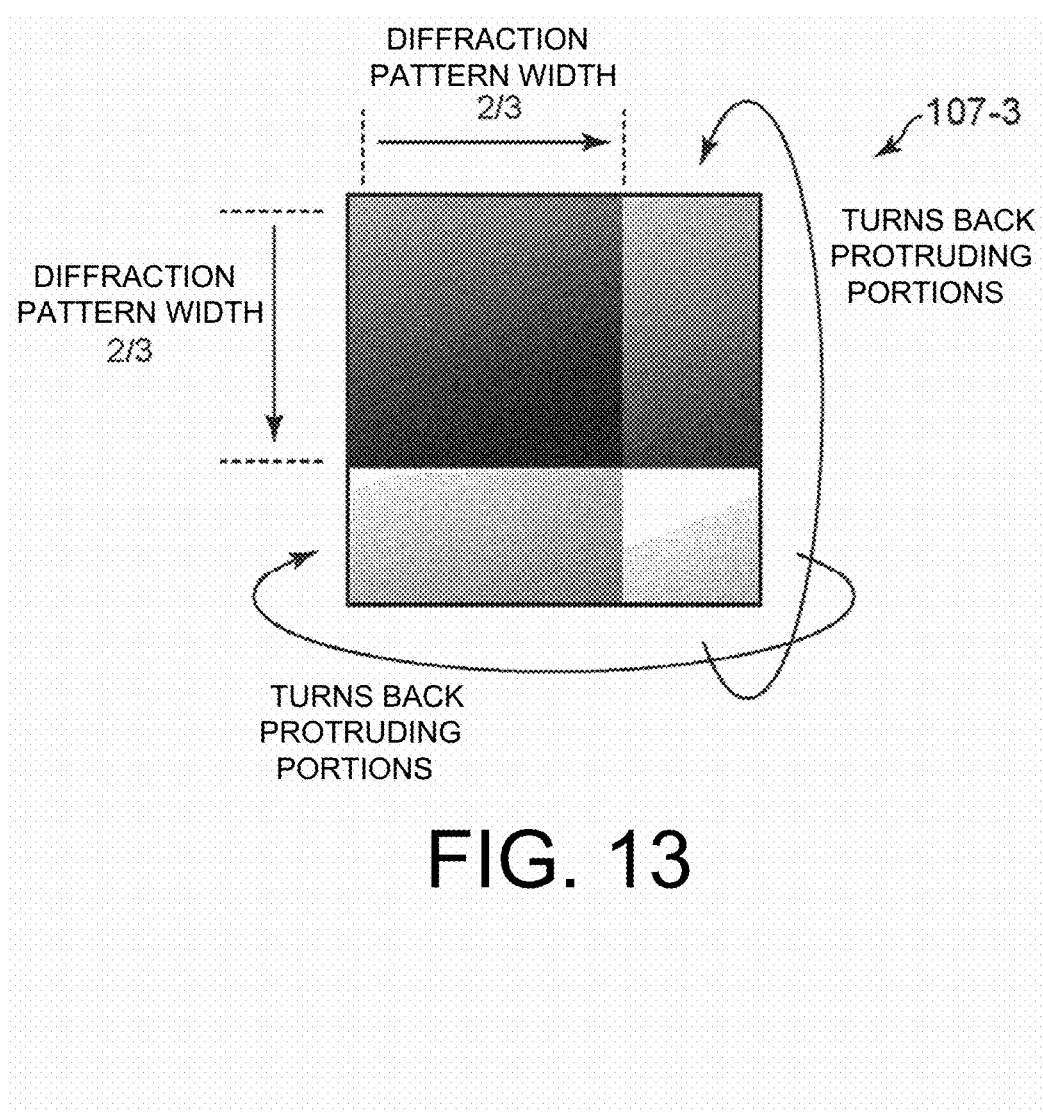
FIG. 13 is a view for illustrating an example of a third diffraction pattern shifted by ⅔ of the diffraction pattern width.

FIG. 13 is a view for illustrating an example of the third diffraction pattern 107-3 shifted by ⅔ of the diffraction pattern width. The third diffraction pattern 107-3 is a pattern obtained by shifting the first diffraction pattern 107-1 by ⅔ of the diffraction pattern width. As shown in FIG. 13, protruding portions are turned back.

Turning back to FIG. 10, when the diffraction pattern 107 shifted as mentioned above is supplied to the liquid crystal diffraction optical element 103, the projected light 113 projected from the projection lens 105 is reflected by a projection surface 114 of a screen and reaches an observation point 115. At the observation point 115, an interference point moves minutely due to shifting of the diffraction pattern 107.

Figure 14:
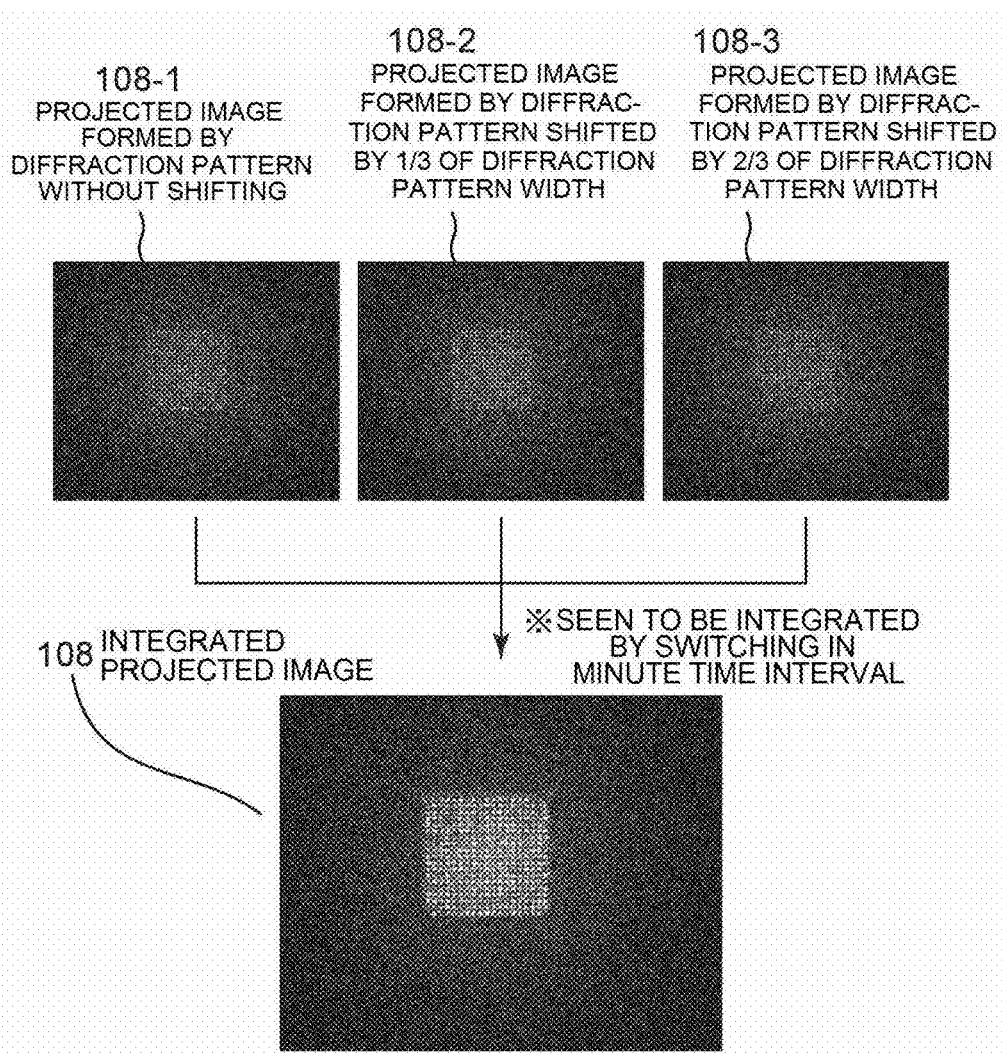
FIG. 14 is a view for illustrating a projected image obtained by shifting the diffraction pattern.

FIG. 14 illustrates the projected image 108 obtained by shifting the diffraction pattern in the above-mentioned manner.

In FIG. 14, a first split projected image 108-1 at the upper left shows a projected image formed by the first diffraction pattern 107-1 without shifting. A second split projected image 108-2 at the upper center shows a projected image formed by the second diffraction pattern 107-2 shifted by 1/3 of the diffraction pattern width. A third split projected image 108-3 at the upper right shows a projected image formed by the third diffraction pattern 107-3 shifted by 2/3 of the diffraction pattern width.

By integrating the first through the third split projected images 108-1 to 108-3, an integrated projected image 108 is formed. That is, the integrated projected image 108 is visible in an integrated state by switching the first through the third split projected images 108-1 to 108-3 in a minute time interval. As a result, it is possible to reduce speckles.

Although the update period (the shift period) of the diffraction pattern 107 is (1/180) seconds in the example being illustrated, a period of one cycle of the diffraction pattern is preferably shorter than a period (about (1/25) seconds) which is sensible by a human being. This is because, in a case where the period is slower, it is recognized that the projected image 108 simply changes without being integrated and an effect of improvement of a picture quality cannot be obtained.

Although a shifting amount of the diffraction pattern 107 is (1/3) of a pattern size (the diffraction pattern width) in the example being illustrated, shifting of the diffraction pattern 107 need not be in a fixed direction and at regular intervals. The reason is as follows. Theoretically, the shorter the update period (the shift period) becomes, the higher the effect of improvement of the picture quality becomes. However, if the period is as short as a response rate of the phase-modulation spatial modulating element 103 is too late, a projected image cannot be formed to cause deterioration of the picture quality. Therefore, the update period (the shift period) and the shifting amount are preferably determined in view of a response characteristic of the phase-modulation spatial modulating element 103 and an intensity distribution characteristic of the laser light source 101.

According to the example embodiment, it is possible to obtain five effects as follows.

A first effect is that it is possible to alleviate deformation of a shape of the projected image caused by the laser light having no-good intensity distribution characteristic and to obtain a good picture quality.

A second effect is that it is possible to alleviate nonuniformity in intensity of the projected image caused by the laser light having no-good intensity distribution characteristic and to obtain a good picture quality.

A third effect is that it is possible to reduce the speckles in the projection device using the laser light source 101.

A fourth effect is that it is possible to achieve a low cost of the projection device 100 because the laser diode 101 itself is inexpensive. This is because the first through the third effects make it unnecessary to take measures against the deformation of the shape of the projected image and nonuniformity of the intensity of the projected image which are caused by the quality of the laser light, and against the speckles.

A fifth effect is that it is possible to miniaturize the projection device 100. This is because the first through the third effects makes it unnecessary to take measures against the deformation of the shape of the projected image and nonuniformity of the intensity of the projected image which are caused by the quality of the laser light, and against the speckles.

Example 1

Figure 15:
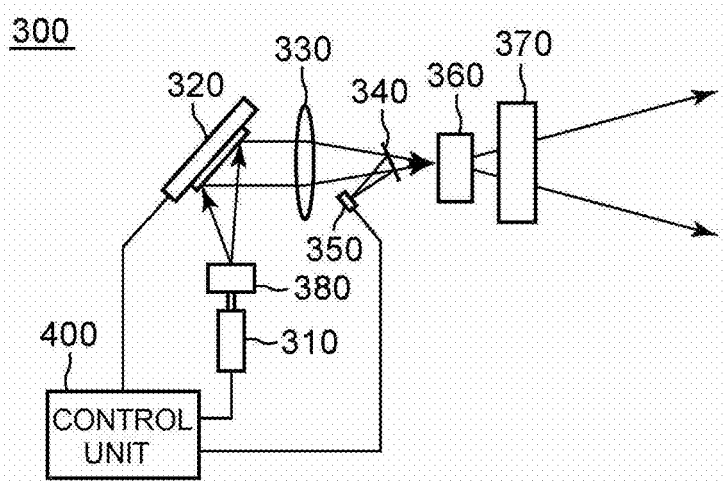
FIG. 15 is a diagram for illustrating a configuration of a projection device according an example of the present invention.

Referring to FIG. 15, description will proceed to a projection device 300 according to a first example of the present invention. The illustrated projection device 300 has a hardware configuration which is same as that of the projection device disclosed in the above-mentioned Patent Literature 1. However, as will be described later, the projection device 300 according to this example is different in operation of the control unit from that of Patent Literature 1.

The projection device 300 includes a laser light source 310, a phase-modulation spatial modulating element 320, a Fourier transform lens 330, a polarization preservation element 340, a monitor element 350, an image forming optical assembly 360, a projection optical assembly 370, a shaping optical assembly 38, and a control unit 400.

The laser light source 310 emits laser light. The phase-modulation spatial modulating element 320 phase-modulates, on the basis of a supplied projection image which will later be described, parallel light which will later be described to deliver phase-modulated light. The Fourier transform lens 330 Fourier-transforms the phase-modulated light to deliver Fourier-transformed light. The polarization preservation element 340 is positioned within an optical path of the Fourier-transformed light and reflects a part of the light as reflected light. The monitor element 350 monitors an intensity of the reflected light to produce a monitored signal.

The control unit 400 controls, on the basis of the intensity of the monitored signal, either the laser light source 310 or the phase-modulation spatial modulating element 320. The image forming optical assembly 360 forms an image of the light transmitted through the polarization preservation element 340 to deliver image-formed light. The projection optical assembly 370 projects the image-formed light towards a screen which is not shown in the figure. The shaping optical assembly 380 is disposed in front of a light output port of the laser light source 310 and shapes the laser light emitted from the laser light source 310 to deliver shaped light. The shaped light is incident to the phase-modulation spatial modulating element 320. In the example being illustrated, the shaped light is the above-mentioned parallel light. That is, the shaping optical assembly 380 not only serves as a collimator for converting the laser light into the parallel light but also serves to shape the laser light.

Figure 16:
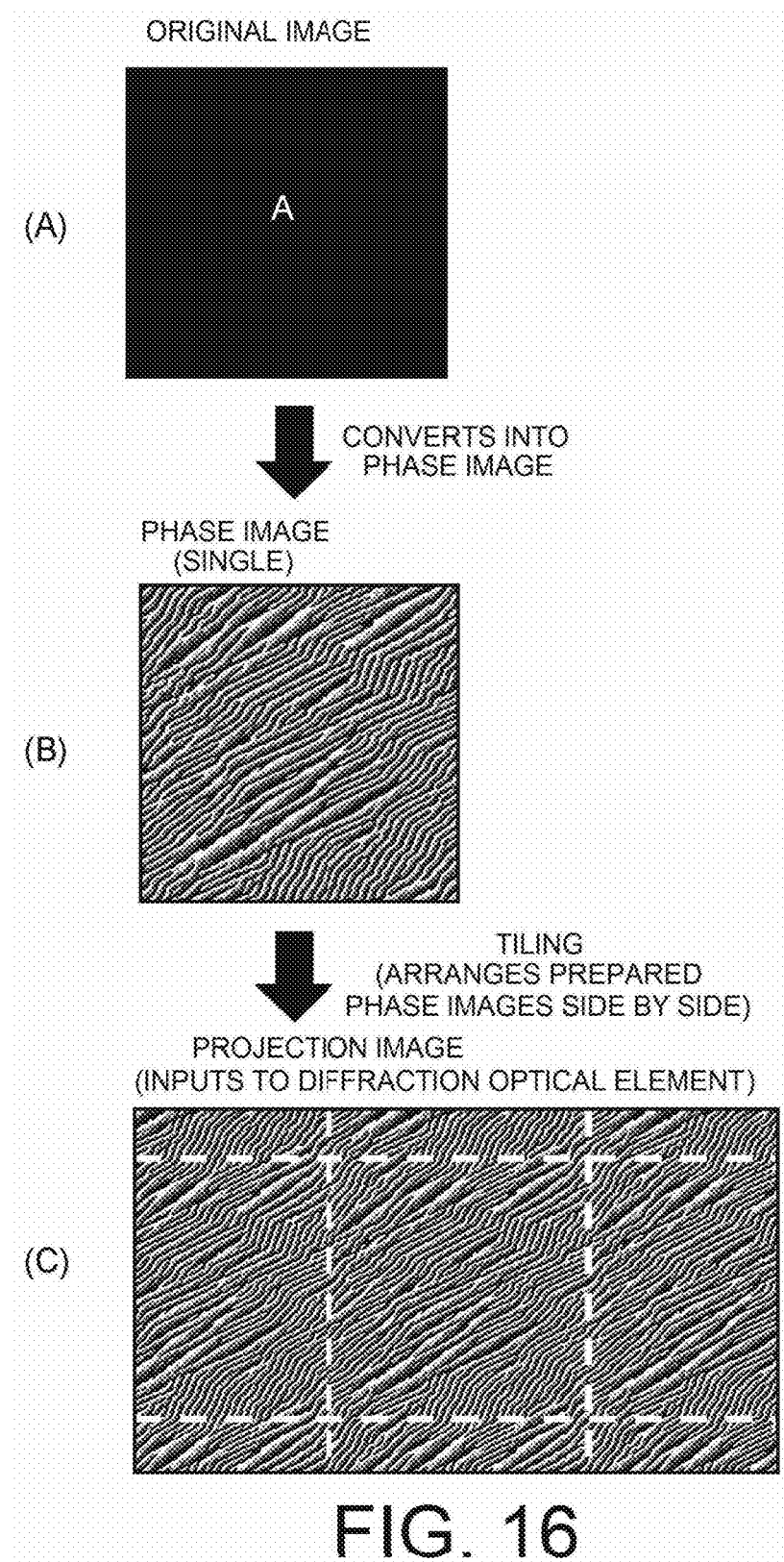
FIG. 16 includes views for use in describing a process for preparing a projection image.

Referring to FIG. 16, description will proceed to a process of preparing the projection image. In this example, it is assumed that a projection image preparing device (not shown) preliminarily prepares the projection image by a process which will hereinafter be described. The projection image corresponds to the above-mentioned diffraction pattern.

FIG. 16 at (A) is a plan view for illustrating an example of an original image. This example illustrates a case where the original image is an image of A. The illustrated original image consists of (512×512) pixels.

The projection image preparing device converts the original image into a phase image as shown in FIG. 16 at (B) by using the above-mentioned iterative Fourier transform method. This phase image is a single image which consists of (512×512) pixels also.

Subsequently, the projection image preparing device obtains the projection image by tiling the phase image. Herein, the "tiling" means to arrange the prepared phase image side by side. The projection image consists of (720×1280) pixels. The projection image is an image which is supplied as the diffraction pattern to the phase-modulation spatial modulating element 320 serving as a diffraction optical element.

The projection image is prepared for each original image. That is, the projection image preparing device prepares a group of projection images which corresponds to a group of original images (in one-to-one correspondence). The group of projection images is stored in a storage unit of the control unit 400.

In the projection device disclosed in Patent Literature 1, the control unit merely controls at least one of the laser light source 310 and the phase-modulation spatial modulating element 320 so that the intensity of the projected light does not exceed a reference value.

In comparison with this, the control unit 400 in this first example controls not only the intensity of the projected light but also a supplied projection image (a diffraction pattern) supplied to the phase-modulation spatial modulating element 320 in the manner which will later be described. Inasmuch as control of the intensity of the projected light is same as that of Patent Literature 1, those points different from Patent Literature 1 will hereinafter be described in detail. Accordingly, the control unit 400 is also called a projection image control unit.

Figure 17:
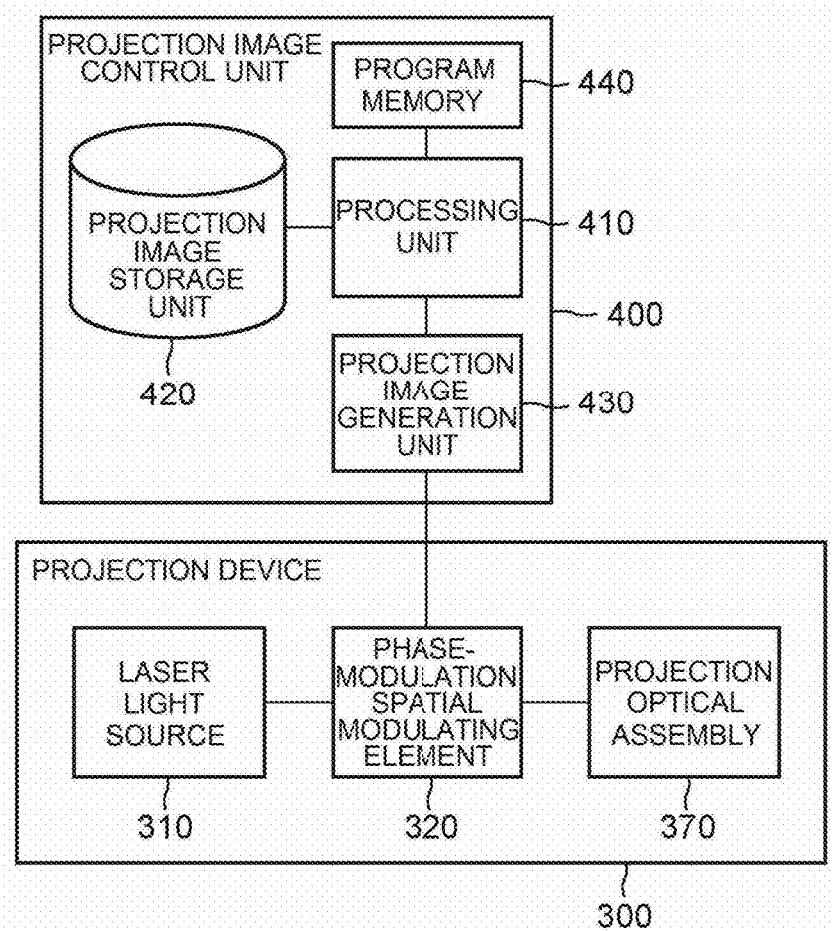
FIG. 17 is a block diagram for illustrating a schematic configuration of an inside of a control unit (a projection image control unit) used in the projection device of FIG. 15.

FIG. 17 is a block diagram for illustrating a schematic configuration of an inside of the projection image control unit 400. The projection image control unit 400 includes a processing unit 410, a projection image storage unit 420, a projection image generation unit 430, and a program memory 440.

The processing unit 410 comprises, for example, a CPU (central processing unit) or the like. The processing unit 410 controls processing of a whole of the projection image control unit 400. The projection image storage unit 420 comprises a HDD (hard disk drive), an SDD (solid state drive), or the like. The projection image storage unit 430 memorizes, therein, the group of projection images prepared as described above. The projection image generation unit 430 generates, to the phase-modulation spatial modulating element 320, a projection image (a diffraction pattern) sent from the processing unit 410 as the supplied projection image. The program memory 440 comprises, for example, an ROM (read only memory), an RAM (random access memory), or the like. The program memory 440 memorizes, therein, a projection image control program (which will later be described) to be executed by the processing unit 410.

Figure 18:
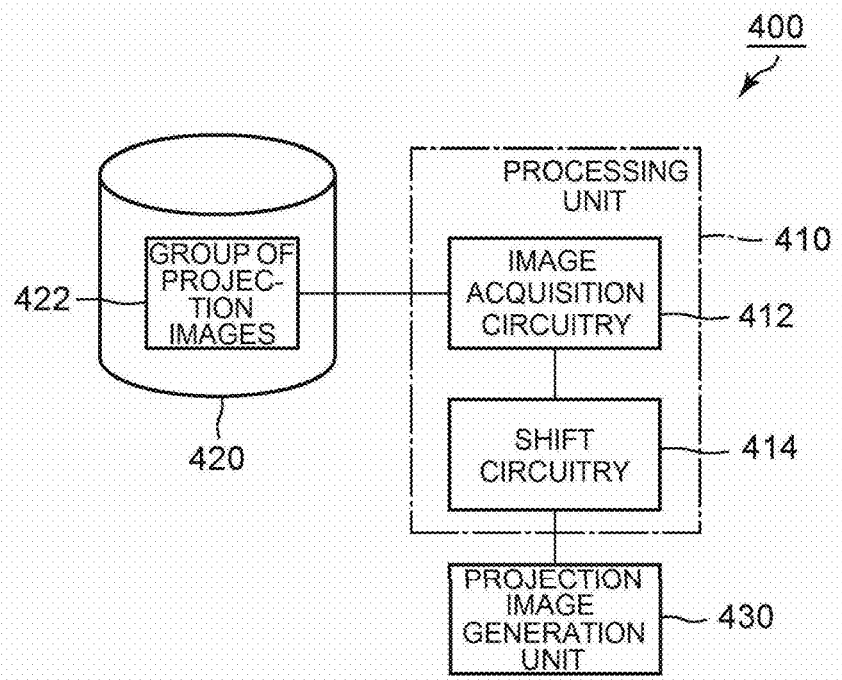
FIG. 18 is a functional block diagram for illustrating, in blocks, functions of a processing unit in the projection image control unit illustrated in FIG. 17.

FIG. 18 is a functional block diagram for illustrating, in blocks, functions of the processing unit 410 in the projection image control unit 400. In FIG. 18, illustration of the program memory 440 is omitted.

The projection image storage unit 420 memorizes the group of projection images 422. The processing unit 410 includes an image acquisition circuitry 412 and a shift circuitry 414. The image acquisition circuitry 412 acquires one projection image from the group of projection images 422 stored in the projection image storage unit 420. The shift circuitry 414 shifts the acquired projection image in the manner which will later be described and delivers the shifted projection image to the projection image generation unit 430.

Next referring to FIG. 19, an operation of the processing unit 410 illustrated in FIG. 18 will be described. Herein, description will proceed to a case where there are, as the group of original images, three original images including an original image of A, an original image of B, and an original image of C. In addition, it is assumed that the projection image has an update period Tr of ($1/60$) seconds.

Figure 19:
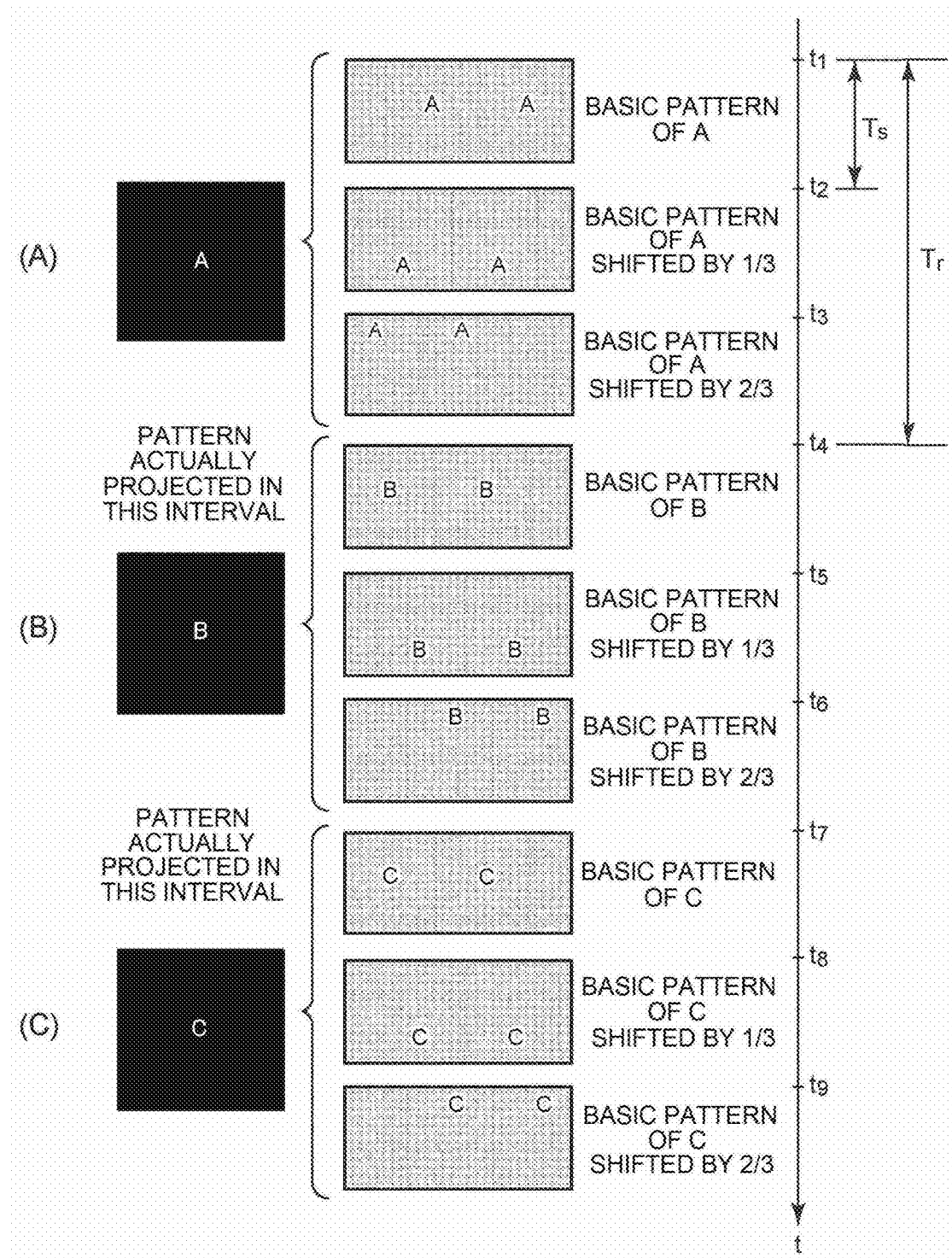
FIG. 19 is a time chart for use in describing an operation of the processing unit illustrated in FIG. 18.

Left sides of (A), (B), and (C) in FIG. 19 show the original image of A, the original image of B, and the original image of C, respectively. As described above, the projection image preparing device prepares, on the basis of the original image of A, the original image of B, and the original image of C, a projection image of A, a projection image of B, and a projection image of C using the iterative Fourier transform method, respectively.

The projection image storage unit 420 memorizes, as the group of projection images 422, the projection image of A, the projection image of B, and the projection image of C. FIG. 19 shows the projection image of A, the projection image of B, and the projection image of C as a basic pattern of A, a basic pattern of B, and a basic pattern of C, respectively.

First of all, the image acquisition circuitry 412 acquires, at a time instant $t_1$, the projection image of A (the basic pattern of A) from the group of projection images 422 stored in the projection image storage unit 420. The image acquisition circuitry 412 retains the basic pattern of A for the update period Tr. The shift circuitry 414 delivers, to the projection image generation unit 430, the acquired basic pattern of A as a diffraction pattern as it is.

Thereafter, at a time instant $t_2$ when a time interval (Tr/3) equal to ($1/3$) of the above-mentioned update period Tr elapses from the time instant $t_1$ at which the basic pattern of A is acquired, the shift circuitry 414 shifts the basic pattern of A by $1/3$ to deliver a shifted pattern to the projection image generation unit 430 as the diffraction pattern. Hereinafter, the time interval (Tr/3) equal to ($1/3$) of the update period Tr is called a shift period Ts. That is, Ts=Tr/3. In the example being illustrated, the shift period Ts is equal to ($1/180$) seconds. Accordingly, the shift circuitry 414 delivers, at the time instant $t_2$ when the shift period Ts elapses from the time instant $t_1$, the pattern obtained by shifting the basic pattern of A by $1/3$ to the projection image generation unit 430 as the diffraction pattern.

Continuously, in the similar manner, the shift circuitry 414 delivers, at a time instant $t_3$ when 2 Ts elapses from the time instant $t_1$, a pattern obtained by shifting the basic pattern of A by $2/3$ to the projection image generation unit 430 as the diffraction pattern.

Next, the image acquisition circuitry 412 acquires, at a time instant $t_4$ when the update period Tr elapses from the time instant $t_1$, the projection image of B (the basic pattern of B) from the group of projection images 422 stored in the projection image storage unit 420. The image acquisition circuitry 412 retains the basis pattern of B for the update period Tr. The shift circuitry 414 delivers, to the projection image generation unit 430, the acquired basic pattern of B as the diffraction pattern as it is.

Thereafter, at a time instant $t_5$ when the shift period Ts elapses from the time instant $t_4$, the shift circuitry 414 delivers a pattern obtained by shifting the basic pattern of B by $1/3$ to the projection image generation unit 430 as the diffraction pattern. Continuously, the shift circuitry 414 delivers, at a time instant $t_6$ when 2 Ts elapses from the time instant $t_4$, a pattern obtained by shifting the basic pattern of B by $2/3$ to the projection image generation unit 430 as the diffraction pattern.

Thereafter, in the similar manner, the image acquisition circuitry 412 acquires, at a time instant $t_7$ when the update period Tr elapses from the time instant $t_4$, the projection image of C (the basic pattern of C) from the group of projection images 422 stored in the projection image storage unit 420. The image acquisition circuitry 412 retains the basic pattern of C for the update period Tr. The shift circuitry 414 delivers, to the projection image generation unit 430, the acquired basic pattern of C as the diffraction pattern as it is.

Thereafter, at a time instant $t_8$ when the shift period Ts elapses from the time instant $t_7$, the shift circuitry 414 delivers a pattern obtained by shifting the basic pattern of C by ⅓ to the projection image generation unit 430 as the diffraction pattern. Continuously, the shift circuitry 414 delivers, at a time instant $t_9$ when 2 Ts elapses from the time instant $t_7$, a pattern obtained by shifting the basic pattern of C by ⅔ to the projection image generation unit 430 as the diffraction pattern.

As described above, in the first example, upon projecting one projection image (e.g. the projection image of A), a combination of three diffraction patterns (in this example, the basic pattern of A, the pattern obtained by shifting the basic pattern of A by ⅓, and the pattern obtained by shifting the basic pattern of A by ⅔) is switched in a short time interval (the shift period Ts), and is supplied to the phase-modulation spatial modulating element 320 as the supplied projection image. As a result, in the first example, it is possible to improve the picture quality of the projected image due to an afterimage effect on visual observation without using the mechanical or the optical measure and to reduce the speckles.

Although the shift period Ts of the diffraction pattern is (1/180) seconds in the first example, it is sufficient that the shift period Ts is shorter than a period (about (1/25) seconds) which is sensible by a human being. In addition, although the shifting amount (the shift amount) of the diffraction pattern is ⅓ of the pattern size in the first example, the shifting amount is not limited thereto. A method of shifting the diffraction pattern may be random instead of shifting in one direction or at regular intervals.

Figure 20:
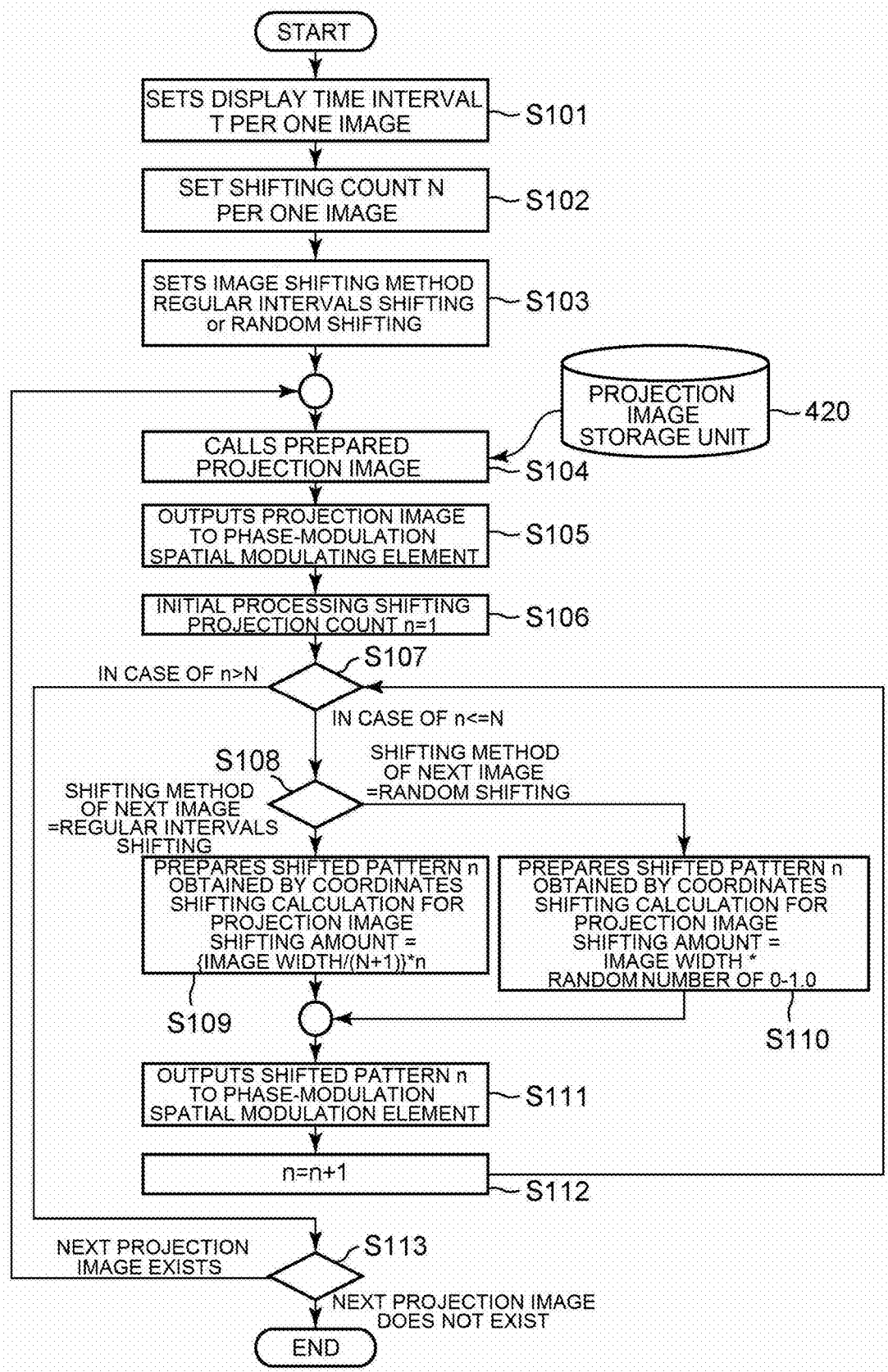
FIG. 20 is a flow chart for use in describing the operation of the processing unit which executes processing in accordance with a projection image control program stored in a program memory of the projection image control unit of FIG. 17.

Next referring to FIG. 20, description will be made in detail about an operation of the processing unit 410 which executes processing in accordance with the projection image control program stored in the program memory 440 of the projection image control unit 400 of FIG. 17.

First of all, the processing unit 410 sets a display time interval T per one image (projection image) (step S101). The display time interval T is equal to the above-mentioned update period Tr. In the example being illustrated, the display time interval T is equal to (1/60) seconds.

Next, the processing unit 410 sets a shifting count N per the one image (projection image) (step S102). In the example being illustrated, the shifting count N is equal to two.

Subsequently, the processing unit 410 sets an image (projection image) shifting method (step S103). Specifically, as the image shifting method, "regular intervals shifting" or "random shifting" is set. In the above-mentioned example, the image shifting method is the "regular intervals shifting".

Next, the processing unit 410 calls, from the projection image storage unit 420, one projection image already prepared (step S104).

Next, the processing unit 410 outputs the called projection image as it is to the phase-modulation spatial modulating element 320 via the projection image generation unit 430 (step S105).

The processing unit 410 sets, as initial processing, a shifting projection count n to one (step S106).

The processing unit 410 determines whether or not n is equal to or less than the shifting count N (step S107).

When n is equal or less than N, the processing unit 410 determines whether or not the image shifting method is the "regular intervals shifting" or the "random shifting" (step S108).

When the image shifting method is the "regular intervals shifting", the processing unit 410 prepares a shifted pattern n obtained by carrying out coordinates shifting calculation for the projection image (step S109). Herein, the shifting amount={image width/(N+1)}×n.

The processing unit 410 outputs the shifted pattern n as the diffraction pattern to the phase-modulation spatial modulating element 320 via the projection image generation unit 430 (step S111). Then, the processing unit 410 increments the shifting projection count n by one (step S112) and returns to the step S107.

In the step S108, when the image shifting method is the "random shifting", the processing unit 410 prepares the shifted pattern n obtained by carrying out coordinates shifting calculation for the projection image (step S110). Herein, the shifting amount=image width×(a random number between 0 and 1.0). Thereafter, the processing unit 410 outputs the shifted pattern n to the phase-modulation spatial modulating element 320 via the projection image generation unit 430 as the diffraction pattern (step S111).

In the step S107, when it is determined that n is larger than N, the processing unit 410 determines whether or not a next projection image exists (step S113). When the next projection image exists, the processing unit 410 returns to the step S104 to continue the processing. On the other hand, when it is determined that the next projection image does not exist, the processing unit 410 finishes the processing.

The above-mentioned first example uses, as a combination of a plurality of diffraction patterns for one projection image, a combination of those obtained by shifting the diffraction pattern. However, in the present invention, the combination of a plurality of diffraction patterns for one projection image is not limited thereto. For example, the present invention may use, as the combination of a plurality of diffraction patterns for one projection image, a combination of two or more types of diffraction patterns which can produce the same one projection image.

Example 2

Figure 21:
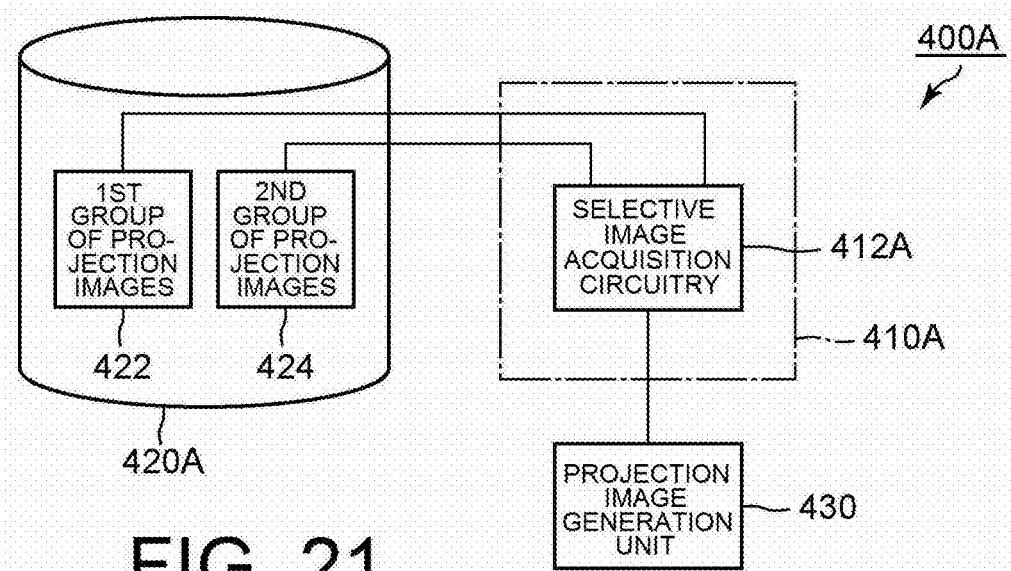
FIG. 21 is a functional block diagram for illustrating a configuration of a projection image control unit used in a projection device according to a second example of the present invention.

Referring to FIG. 21, description will proceed to a projection image control unit 400A for use in the projection device 300 according to a second example of this invention. The illustrated projection image control unit 400A includes a processing unit 410A, a projection image storage unit 420A, and the projection image generation unit 430. Illustration of the program memory is omitted.

As described above, the above-mentioned first example uses only one group of projection images 422 as the group of projection images. Then, the above-mentioned first example uses, as the one group of projection images 422, a group of projection images obtained by converting the group of original images using the iterative Fourier transform method.

In comparison with this, the second example uses, as a group of projection images, two groups of projection images, that is, a first group of projection images 422 and a second group of projection images 424. The second example uses, as the first group of projection images 422, the group of projection images which is obtained by converting the group of original images using the iterative Fourier transform method in the manner similar to the above-mentioned first example. The second example uses, as the second group of projection images 424, a group of projection images which is obtained by converting the group of original images using the above-mentioned direct binary search (DBS) method.

The projection image storage unit 420A memorizes the first group of projection images 422 and the second group of projection images 424 therein. In this event, the first group of projection images 422 and the second group of projection images 424 are stored in the projection image storage unit 420A in association with each other so that a first projection image and a second projection image, which are obtained by converting the same original image, correspond to the same original image.

The processing unit 410A comprises a selective image acquisition circuitry 412A. The second example uses the above-mentioned update period Tr which is divided into a first half and a second half. That is, the selective image acquisition circuitry 412A selectively acquires a first projection image from the first group of projection images 422 at the first half of the update period Tr and delivers a first selectively acquired projection image (a first diffraction pattern) to the projection image generation unit 430. Then, the selective image acquisition circuitry 412A selectively acquires a second projection image, which corresponds to the first selectively acquired projection image, from the second group of projection images 424 at the second half of the update period Tr to deliver a second selectively acquired projection image (a second diffraction pattern) to the projection image generation unit 430.

As described above, in the second example, upon projecting one projection image, a combination of two types of diffraction patterns prepared by the different image forming techniques is switched within the update period and is supplied to the phase-modulation spatial modulating element 320 as the supplied projection image. As a result, in the second example also, it is possible to improve the picture quality of the projected image due to an afterimage effect on visual observation without using the mechanical or the optical measure and to reduce the speckles.

Example 3

Figure 22:
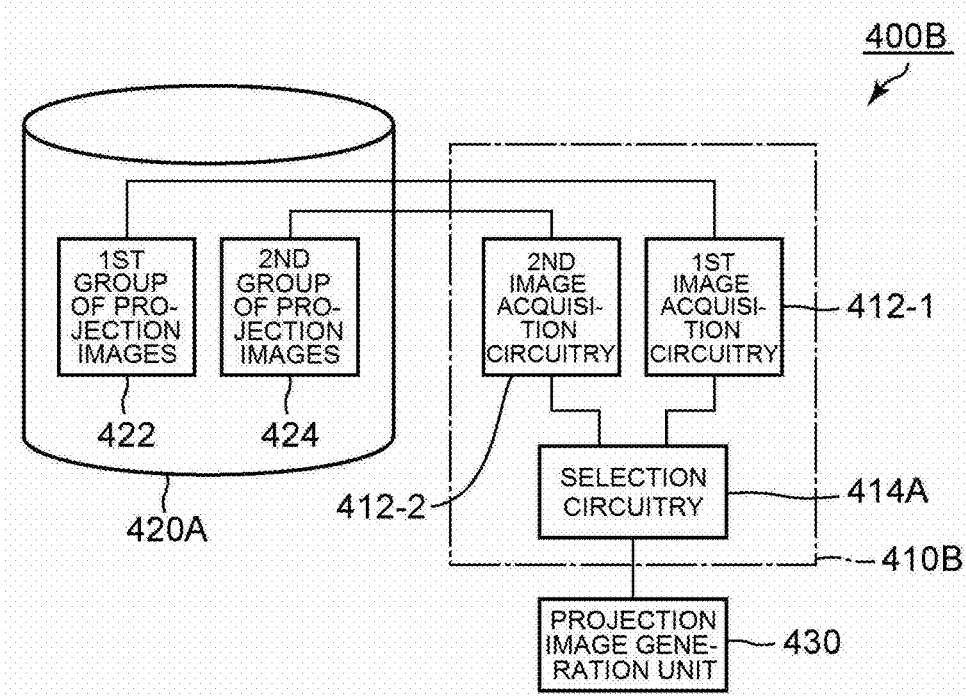
FIG. 22 is a functional block diagram for illustrating a configuration of a projection image control unit used in a projection device according to a third example of the present invention.

Referring to FIG. 22, description will proceed to a projection image control unit 400B for use in the projection device 300 according to a third example of this invention. The illustrated projection image control unit 400B is similar in configuration and operation to the projection image control unit 400A illustrated in FIG. 21 except that a configuration of the processing unit is different from that of the second example as will later be described. The processing unit is therefore depicted at a reference numeral 410B.

In the third example also, the projection image storage unit 420A memorizes the first group of projection images 422 and the second group of projection images 424 therein.

On the other hand, the processing unit 410B includes a first image acquisition circuitry 412-1, a second image acquisition circuitry 412-2, and a selection circuitry 414A.

The first image acquisition circuitry 412-1 acquires, as a first acquired projection image, a first projection image from the first group of projection images 422 in synchronism with the update period Tr. Likewise, the second image acquisition circuitry 412-2 acquires, as a second acquired projection image, a second projection image from the second group of projection images 424 in synchronism with the update period Tr. The selection circuitry 414A selects the first acquired projection image acquired by the first image acquisition circuitry 412-1 at the first half of the update period Tr to deliver a first selected projection image (a first diffraction pattern) to the projection image generation unit 430. On the other hand, the selection circuitry 414A selects the second acquired projection image acquired by the second image acquisition circuitry 412-2 at the second half of the update period Tr to deliver a second selected projection image (a second diffraction pattern) to the projection image generation unit 430.

Accordingly, in the third example, a combination of diffraction patterns sent from the processing unit 410B to the projection image generation unit 430 is same as a combination of diffraction patterns sent from the processing unit 410A to the projection image generation unit 430 in the above-mentioned second example.

As described above, in the third example also, upon projecting one projection image, t a combination of two types of diffraction patterns prepared by the different image forming techniques is switched within the update period and supplied to the phase-modulation spatial modulating element 320 as the supplied projection image. As a result, in the third example also, it is possible to improve the picture quality of the projected image due to an afterimage effect on visual observation without using the mechanical or the optical measure and to reduce the speckles.

In the second and the third examples mentioned above, description has been made about the examples using the two types of projection images obtained by using as the image forming techniques two types of methods (e.g. the iterative Fourier transform method and the direct binary search (DBS) method). However, in the present invention, the image forming techniques are not limited to the two kinds of image forming methods. That is, the present invention is also applicable to an example which uses M types of projection images which are obtained by using M types of image forming methods as the image forming techniques, where M represents an integer which is not less than two.

In this event, in the second and the third examples, the projection image storage unit 420A may be expanded (modified) so as to memorize first through M-th groups of projection images therein. In addition, in the third example, the processing unit 410B may be modified so as to comprise first through M-th image acquisition circuitries 412-1 to 412-M and the selection circuitry 414A.

In addition, in the first through the third examples mentioned above, each of the projection image control units 400, 400A, and 400B may be implemented by using a combination of hardware such as an information processing unit and software. In a form in which the hardware and the software are combined, the respective parts are implemented as various kinds of means by storing a projection image control program in the program memory 440 and making hardware such as the processing unit (CPU) 410, 410A, or 410B operate based on the projection image control program. The projection image control program may be recorded in a recording medium to be distributed. The projection image control program recorded in the recording medium is read into a memory via a wire, wirelessly, or via the recording medium itself to operate the control unit and so on. By way of example, the recording medium may be an optical disc, a magnetic disk, a semiconductor memory device, a hard disk, or the like.

Explaining the above-mentioned first example with a different expression, it is possible to implement the first example by making a computer to be operated as the projection image control unit 400 act as the image acquisition circuitry 412 and shift circuitry 414 according to the projection image control program stored in the program memory 440.

Explaining the above-mentioned second example with a different expression, it is possible to implement the second example by making a computer to be operated as the projection image control unit 400A act as the selective image acquisition circuitry 412A according to the projection image control program stored in the program memory 440.

Explaining the above-mentioned third example with a different expression, it is possible to implement the third example by making a computer to be operated as the projection image control unit 400B act as the first image acquisition circuitry 412-1, the second image acquisition circuitry 412-2, and the selection circuitry 414A according to the projection image control program stored in the program memory 440.

While the example embodiment of the present invention and the examples thereof have been described with reference to the drawings, it should be noted that those of ordinary skill can use other similar example embodiments and examples and can appropriately carry out any change or addition of embodiments in a range not departing from this invention.

For example, in the above-mentioned examples, the projection device 300 comprises, as a hardware configuration, the laser light source 310, the shaping optical assembly 380, the phase-modulation spatial modulating element 320, the Fourier transform lens 330, the image forming optical assembly 360, and the projection optical assembly 370. However, the present invention is not limited to such a hardware configuration. For example, in the projection device, the Fourier transform lens 330, the image forming optical assembly 360, and the projection optical assembly 370 may be omitted from the above-mentioned hardware configuration. In other words, the projection device to which the present invention is applicable may at least comprise, as the hardware configuration, the laser light source 310, conversion means, such as the shaping optical assembly 380, for converting the laser light into the parallel light, and the phase-modulation spatial modulating element 320. Herein, the conversion means may comprise a member having at least a function of converting the laser light into the parallel light and, for example, may be the above-mentioned collimator (collimator lens).

However, such a configuration has a disadvantage that a view angle of projection becomes narrow and a fixed distance is necessary to obtain the projected image. However, such a disadvantage is not an essential matter in the present invention. In addition, the distance at which the projected image is obtained is called a Fraunhofer region in this technical field.

A part or a whole of the example embodiment described above can be described as, but not limited to, the following supplementary notes.

(Supplementary Note 1)

A projection device, at least comprising:

a laser light source configured to emit laser light;

a conversion unit configured to convert the laser light into parallel light;

a phase-modulation spatial modulating element configured to phase-modulate the parallel light on the basis of a supplied projection image to deliver phase-modulated light; and a control unit configured to control the supplied projection image, wherein the control unit comprises:

a projection image storage unit configured to memorize at least one group of projection images therein;

a processing unit configured to generate, with respect to one projection image acquired from the projection image storage unit in synchronism with an update period, a combination of a plurality of diffraction patterns within the update period; and a projection image generation unit configured to supply the combination of the plurality of diffraction patterns to the phase-modulation spatial modulating element as the supplied projection image.

(Supplementary Note 2)

The projection device according to Supplementary note 1, wherein the projection image storage unit is configured to memorize the one group of projection images therein, wherein the processing unit comprises:

an image acquisition circuitry configured to acquire the one projection image from the one group of projection images in synchronism with the update period to produce an acquired projection image; and a shift circuitry configured to shift the acquired projection image in a shift period shorter than the update period to generate a combination of a plurality of shifted diffraction patterns within the update period, wherein the projection image generation unit is configured to supply the combination of the plurality of shifted diffraction patterns to the phase-modulation spatial modulating element as the supplied projection image.

(Supplementary Note 3)

The projection device according to Supplementary Note 1, wherein the projection image storage unit is configured to memorize, therein, first through M-th groups of projection images which are generated from a group of original images by different types of image forming techniques, where M represents an integer which is not less than two, wherein the processing unit comprises a selective image acquisition circuitry configured to selectively acquire first through M-th projection images from the first through the M-th groups of projection images within the update period, respectively, to generate a combination of first through M-th selectively acquired projection images, wherein the projection image generation unit is configured to supply the combination of the first through the M-th selectively acquired projection images to the phase-modulation spatial modulating element as the supplied projection image.

(Supplementary Note 4)

The projection device according to Supplementary Note 1, wherein the projection image storage unit is configured to memorize, therein, first through M-th groups of projection images which are generated from a group of original images by different types of image forming techniques, where M represents an integer which is not less than two, wherein the processing unit comprises:

first through M-th image acquisition circuitries configured to acquire first through M-th projection images from the first through the M-th groups of projection images in synchronism with the update period, respectively, to produce first through M-th acquired projection images; and a selection circuitry configured to successively select the first through the M-th acquired projection images within the update period to generate a combination of first through M-th selected projection images, wherein the projection image generation unit is configured to supply the combination of the first through the M-th selected projection images to the phase-modulation spatial modulating element as the supplied projection image.

(Supplementary Note 5)

A projection image control method which is used in a projection device at least comprising a laser light source configured to emit laser light; a conversion unit configured to covert the laser light into parallel light; and a phase-modulation spatial modulating element configured to phase-modulate the parallel light on the basis of a supplied projection image to deliver phase-modulated light, and which is adapted to control the supplied projection image, the projection image control method comprises:

preliminarily memorizing at least one group of projection images in a projection image storage unit;

generating, with respect to one projection image acquired from the projection image storage unit in synchronism with an update period, a combination of a plurality of diffraction patterns within the update period; and supplying the combination of the plurality of diffraction patterns to the phase-modulation spatial modulating element as the supplied projection image.

(Supplementary Note 6)

The projection image control method according to Supplementary Note 5, wherein the preliminarily memorizing memorizes the one group of projection images in the projection image storage unit;

wherein the generating includes:

acquiring the one projection image from the one group of projection images in synchronism with the update period to produce an acquired projection image; and shifting the acquired projection image in a shift period shorter than the update period to generate a combination of a plurality of shifted diffraction patterns within the update period, wherein the supplying the combination of the plurality of shifted diffraction patterns to the phase-modulation spatial modulating element as the supplied projection image.

(Supplementary Note 7)

The projection image control method according to Supplementary Note 5, wherein the preliminarily memorizing memorizes, in the projection image storage unit, first through M-th groups of projection images which are generated from a group of original images by different types of image forming techniques, where M represents an integer which is not less than two, wherein the generating comprises selectively acquiring first through M-th projection images from the first through the M-th groups of projection images within the update period, respectively, to generate a combination of first through M-th selectively acquired projection images;

wherein the supplying the combination of the first through the M-th selectively acquired projection images to the phase-modulation spatial modulating element as the supplied projection image.

(Supplementary Note 8)

The projection image control method according to Supplementary Note 5, wherein the preliminarily memorizing memorizes, in the projection image storage unit, first through M-th groups of projection images which are generated from a group of original images by different types of image forming techniques, where M represents an integer which is not less than two, wherein the generating includes:

acquiring first through M-th projection images from the first through the M-th groups of projection images in synchronism with the update period, respectively, to produce first through M-th acquired projection images; and successively selecting the first through the M-th acquired projection images within the update period to generate a combination of first through M-th selected projection images;

wherein the supplying the combination of the first through the M-th selected projection images to the phase-modulation spatial modulating element as the supplied projection image.

(Supplementary Note 9)

A non-transitory computer readable recording medium with a projection image control program recorded therein to cause a controller in a projection device at least comprising a laser light source configured to emit laser light; a conversion unit configured to covert the laser light into parallel light; and a phase-modulation spatial modulating element configured to phase-modulate the parallel light on the basis of a supplied projection image to deliver phase-modulated light, to control the supplied projection image, wherein the controller comprises a projection image storage unit configured to memorize at least one group of projection images therein and a projection image generation unit configured to supply the supplied projection image to the phase-modulation spatial modulating element, wherein the projection image control program causes the controller to execute:

a processing step of generating, with respect to one projection image acquired from the projection image storage unit in synchronism with an update period, a combination of a plurality of diffraction patterns within the update period, and causing the projection image generation unit to generate the combination of the plurality of diffraction patterns as the supplied projection image.

(Supplementary Note 10)

The non-transitory computer readable recording medium with the projection image control program recorded therein according to Supplementary Note 9, wherein the projection image storage unit memorizes the one group of projection images therein, wherein the processing step comprises:

an image acquiring step of acquiring the one projection image from the one group of projection images in synchronism with the update period to produce an acquired projection image; and a shifting step of shifting the acquired projection image in a shift period shorter than the update period to generate a combination of a plurality of shifted diffraction patterns within the update period, and causing the projection image generation unit to generate the combination of the plurality of shifted diffraction patterns as the supplied projection image.

(Supplementary Note 11)

The non-transitory computer readable recording medium with the projection image control program recorded therein according to Supplementary Note 9, wherein the projection image storage unit memorizes, therein, first through M-th groups of projection images which are generated from a group of original images by different types of image forming techniques, where M represents an integer which is not less than two, wherein the processing step comprises a selective image acquiring step of selectively acquiring first through M-th projection images from the first through the M-th groups of projection images within the update period, respectively, to generate a combination of first through M-th selectively acquired projection images, and causing the projection image generation unit to generate the combination of the first through the M-th selectively acquired projection images as the supplied projection image.

(Supplementary Note 12)

The non-transitory computer readable recording medium with the projection image control program recorded therein according to Supplementary Note 9, wherein the projection image storage unit memorizes, therein, first through M-th groups of projection images which are generated from a group of original images by different types of image forming techniques, where M represents an integer which is not less than two, wherein the processing step comprises:

first through M-th image acquiring processes of acquiring first through M-th projection images from the first through the M-th groups of projection images in synchronism with the update period, respectively, to produce first through M-th acquired projection images; and a selecting step of successively selecting the first through the M-th acquired projection images within the update period to generate a combination of first through M-th selected projection images, and causing the projection image generation unit to generate the combination of the first through the M-th selected projection images as the supplied projection image.

REFERENCE SIGNS LIST

100: projection device
101: laser light source
102: collimator
103: liquid crystal diffraction optical element (phase-modulation spatial modulating element)
104: Fourier transform lens
105: projection lens
106: optical path
107: diffraction pattern
107-1: first diffraction pattern
107-2: second diffraction pattern
107-3: third diffraction pattern
108: projected image
108-1: first split projected image
108-2: second split projected image
108-3: third split projected image
113: projected light
114: projection surface
115: observation point
200: control unit (controller)
300: projection device
310: laser light source
320: phase-modulation spatial modulating element
330: Fourier transform lens
340: polarization preservation element
350: monitor element
360: image forming optical assembly
370: projection optical assembly
380: shaping optical assembly
400, 400A, 400B: control unit (projection image control unit: controller)
410, 410A, 410B: processing unit
412: image acquisition circuitry
412A: selective image acquisition circuitry
412-1: first image acquisition circuitry
412-2: second image acquisition circuitry
414: shift circuitry
414A: selection circuitry
420, 420A: projection image storage unit
422: group of projection images (first group of projection images)
424: second group of projection images
430: projection image generation unit
440: program memory

The invention claimed is:

1. A projection device, at least comprising:
a laser light source configured to emit laser light;
a conversion unit configured to convert the laser light into parallel light;
a phase-modulation spatial modulating element configured to phase-modulate the parallel light using a supplied projection image to deliver phase-modulated light; and
a control unit configured to control the supplied projection image,
wherein the control unit comprises:
a projection image storage unit configured to memorize at least one group of projection images therein;
a processing unit configured to generate, with respect to one projection image acquired from the projection image storage unit in synchronism with an update period, a combination of a plurality of diffraction patterns within the update period so as to move an interference point minutely; and
a projection image generation unit configured to supply the combination of the plurality of diffraction patterns to the phase-modulation spatial modulating element as the supplied projection image.

2. The projection device as claimed in claim 1, wherein the projection image storage unit is configured to memorize the one group of projection images therein,
wherein the processing unit comprises:
an image acquisition circuitry configured to acquire the one projection image from the one group of projection images in synchronism with the update period to produce an acquired projection image; and
a shift circuitry configured to shift the acquired projection image in a shift period shorter than the update period to generate a combination of a plurality of shifted diffraction patterns within the update period, and
wherein the projection image generation unit is configured to supply the combination of the plurality of shifted diffraction patterns to the phase-modulation spatial modulating element as the supplied projection image.

3. The projection device as claimed in claim 1, wherein the projection image storage unit is configured to memorize, therein, first through M-th groups of projection images which are generated from a group of original images by different types of image forming techniques, where M represents an integer which is not less than two,
wherein the processing unit comprises a selective image acquisition circuitry configured to selectively acquire first through M-th projection images from the first through the M-th groups of projection images within the update period, respectively, to generate a combination of first through M-th selectively acquired projection images, and
wherein the projection image generation unit is configured to supply the combination of the first through the M-th selectively acquired projection images to the phase-modulation spatial modulating element as the supplied projection image.

4. The projection device as claimed in claim 1:
wherein the projection image storage unit is configured to memorize, therein, first through M-th groups of projection images which are generated from a group of original images by different types of image forming techniques, where M represents an integer which is not less than two, wherein the processing unit comprises:

first through M-th image acquisition circuitries configured to acquire first through M-th projection images from the first through the M-th groups of projection images in synchronism with the update period, respectively, to produce first through M-th acquired projection images; and a selection circuitry configured to successively select the first through the M-th acquired projection images within the update period to generate a combination of first through M-th selected projection images, and wherein the projection image generation unit is configured to supply the combination of the first through the M-th selected projection images to the phase-modulation spatial modulating element as the supplied projection image.

5. A projection image control method which is used in a projection device at least comprising a laser light source configured to emit laser light; a conversion unit configured to covert the laser light into parallel light; and a phase-modulation spatial modulating element configured to phase-modulate the parallel light using a supplied projection image to deliver phase-modulated light, and which is adapted to control the supplied projection image, wherein the projection image control method comprises:

preliminarily memorizing at least one group of projection images in a projection image storage unit;

generating, with respect to one projection image acquired from the projection image storage unit in synchronism with an update period, a combination of a plurality of diffraction patterns within the update period so as to move an interference point minutely; and supplying the combination of the plurality of diffraction patterns to the phase-modulation spatial modulating element as the supplied projection image.

6. The projection image control method as claimed in claim 5, wherein the preliminarily memorizing memorizes the one group of projection images in the projection image storage unit;

wherein the generating includes:

acquiring the one projection image from the one group of projection images in synchronism with the update period to produce an acquired projection image; and shifting the acquired projection image in a shift period shorter than the update period to generate a combination of a plurality of shifted diffraction patterns within the update period, and wherein the supplying supplies the combination of the plurality of shifted diffraction patterns to the phase-modulation spatial modulating element as the supplied projection image.

7. The projection image control method as claimed in claim 5, wherein the preliminarily memorizing memorizes, in the projection image storage unit, first through M-th groups of projection images which are generated from a group of original images by different types of image forming techniques, where M represents an integer which is not less than two, wherein the generating comprises selectively acquiring first through M-th projection images from the first through the M-th groups of projection images within the update period, respectively, to generate a combination of first through M-th selectively acquired projection images, and wherein the supplying supplies the combination of the first through the M-th selectively acquired projection images to the phase-modulation spatial modulating element as the supplied projection image.

8. The projection image control method as claimed in claim 5, wherein the preliminarily memorizing memorizes, in the projection image storage unit, first through M-th groups of projection images which are generated from a group of original images by different types of image forming techniques, where M represents an integer which is not less than two, wherein the generating includes:

acquiring first through M-th projection images from the first through the M-th groups of projection images in synchronism with the update period, respectively, to produce first through M-th acquired projection images; and successively selecting the first through the M-th acquired projection images within the update period to generate a combination of first through M-th selected projection images, and wherein the supplying supplies the combination of the first through the M-th selected projection images to the phase-modulation spatial modulating element as the supplied projection image.

9. A non-transitory computer readable recording medium with a projection image control program recorded therein that, if executed, causes a controller in a projection device at least comprising a laser light source configured to emit laser light; a conversion unit configured to covert the laser light into parallel light; and a phase-modulation spatial modulating element configured to phase-modulate the parallel light using a supplied projection image to deliver phase-modulated light, to control the supplied projection image, wherein the controller comprises a projection image storage unit configured to memorize at least one group of projection images therein and a projection image generation unit configured to supply the supplied projection image to the phase-modulation spatial modulating element, and wherein the projection image control program causes the controller to execute:

a processing operation of generating, with respect to one projection image acquired from the projection image storage unit in synchronism with an update period so as to move an interference point minutely, a combination of a plurality of diffraction patterns within the update period, and causing the projection image generation unit to generate the combination of the plurality of diffraction patterns as the supplied projection image.

10. The non-transitory computer readable recording medium with the projection image control program recorded therein as claimed in claim 9, wherein the projection image storage unit memorizes the one group of projection images therein, and wherein the processing operation comprises:

an image acquiring operation of acquiring the one projection image from the one group of projection images in synchronism with the update period to produce an acquired projection image; and a shifting operation of shifting the acquired projection image in a shift period shorter than the update period to generate a combination of a plurality of shifted diffraction patterns within the update period, and causing the projection image generation unit to generate the combination of the plurality of shifted diffraction patterns as the supplied projection image.

11. The non-transitory computer readable recording medium with the projection image control program recorded therein as claimed in claim 9, wherein the projection image storage unit memorizes, therein, first through M-th groups of projection images which are generated from a group of original images by different types of image forming techniques, where M represents an integer which is not less than two, and wherein the processing operation comprises a selective image acquiring operation of selectively acquiring first through M-th projection images from the first through the M-th groups of projection images within the update period, respectively, to generate a combination of first through M-th selectively acquired projection images, and causing the projection image generation unit to generate the combination of the first through the M-th selectively acquired projection images as the supplied projection image.

12. The non-transitory computer readable recording medium with the projection image control program recorded therein as claimed in claim 9, wherein the projection image storage unit memorizes, therein, first through M-th groups of projection images which are generated from a group of original images by different types of image forming techniques, where M represents an integer which is not less than two, and wherein the processing operation comprises:

first through M-th image acquiring processes of acquiring first through M-th projection images from the first through the M-th groups of projection images in synchronism with the update period, respectively, to produce first through M-th acquired projection images; and a selecting operation of successively selecting the first through the M-th acquired projection images within the update period to generate a combination of first through M-th selected projection images, and causing the projection image generation unit to generate the combination of the first through the M-th selected projection images as the supplied projection image.

\* \* \* \* \*

UNITED STATES PATENT AND TRADEMARK OFFICE
CERTIFICATE OF CORRECTION

| | | |
|---|---|---|
| PATENT NO. | : 10,859,845 B2 | Page 1 of 1 |
| APPLICATION NO. | : 16/498800 | |
| DATED | : December 8, 2020 | |
| INVENTOR(S) | : Satoshi Kyosuna, Satoshi Komatsu and Hirofumi Tsuda | |

It is certified that error appears in the above-identified patent and that said Letters Patent is hereby corrected as shown below:

In the Specification

Column 5, Summary of Invention, Line 65; Before "unit", delete "means"

Signed and Sealed this
Twenty-third Day of March, 2021

Drew Hirshfeld
*Performing the Functions and Duties of the*
*Under Secretary of Commerce for Intellectual Property and*
*Director of the United States Patent and Trademark Office*